US009534635B2

(12) United States Patent
Norimatsu et al.

(10) Patent No.: US 9,534,635 B2
(45) Date of Patent: Jan. 3, 2017

(54) WHEEL BEARING APPARATUS

(75) Inventors: Takayuki Norimatsu, Iwata (JP); Hiroaki Itakura, Iwata (JP); Hironori Imanaka, Iwata (JP); Syougo Suzuki, Iwata (JP); Isao Hirai, Iwata (JP); Hiroya Kato, Iwata (JP); Akira Fujimura, Iwata (JP); Kikuo Fukada, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/214,280

(22) Filed: Aug. 22, 2011

(65) Prior Publication Data

US 2011/0304197 A1 Dec. 15, 2011

Related U.S. Application Data

(62) Division of application No. 11/542,561, filed on Oct. 3, 2006.

(30) Foreign Application Priority Data

Oct. 4, 2005 (JP) .................................. 2005-291303
Oct. 4, 2005 (JP) .................................. 2005-291304
(Continued)

(51) Int. Cl.
*F16C 33/78* (2006.01)
*B60B 27/00* (2006.01)
(Continued)

(52) U.S. Cl.
CPC ........... *F16C 33/7896* (2013.01); *B60B 27/00* (2013.01); *F16C 19/386* (2013.01);
(Continued)

(58) Field of Classification Search
CPC .............. F16C 33/7883; F16C 33/7879; F16C 33/7886; F16C 33/7889; F16C 33/7869; F16C 33/7826; F16C 19/386; F16C 2326/02; B60B 27/001
(Continued)

(56) References Cited

U.S. PATENT DOCUMENTS 2,956,632 A * 10/1960 Forbush et al. ............... 384/544
3,936,105 A * 2/1976 Asberg .......................... 384/482
(Continued)

FOREIGN PATENT DOCUMENTS

EP      1 128 078           8/2001
EP      1128078 A2 *        8/2001
(Continued)

OTHER PUBLICATIONS

JP,2005-291485,A. Japan Patent Office. Jun. 13, 2013. http://dossier1.ipdl.inpit.go.jp/AIPN/odse_call_transl.ipdl?N0000=7413&N0005=Ei7BzenZVnBvfz7D1ZIK&N0120=01&N2001=2&N3001=2005-291485&Ntt3=autoV14&Ntt4=machineV14&Ntt5=logisticsV14&Ntt6=&Ntt7=&Ntt8=&Ntt9=&Ntt10=&Ntt11=&Ntt12=.*

*Primary Examiner* — Daniel Yabut
(74) *Attorney, Agent, or Firm* — Harness, Dickey & Pierce, P.L.C.

(57) ABSTRACT

A wheel bearing apparatus has an outer member, an inner member, at least one inner ring fit onto the inner member. Double row rolling elements are rollably arranged between the outer and inner raceway surfaces, via cages. A seal is mounted on one end of the outer member. The seal has side lips adapted to be in sliding contact with the wheel hub. The seal has three inclined side lips each extending radially outward from the seal body. The lips are adapted to be in sliding contact with the base of the wheel mounting flange. Interference of the side lips against the base of the wheel mounting flange is set so that the radially inner side lip has
(Continued)

a smaller interference than that of the radially outer side lips, in order.

4 Claims, 13 Drawing Sheets

(30) Foreign Application Priority Data

Nov. 11, 2005 (JP) ................................ 2005-327435
Jan. 23, 2006 (JP) ................................ 2006-013805

(51) Int. Cl.
*F16C 19/38* (2006.01)
*F16C 19/18* (2006.01)

(52) U.S. Cl.
CPC ...... *F16C 33/7826* (2013.01); *F16C 33/7876* (2013.01); *F16C 33/7879* (2013.01); *F16C 19/186* (2013.01); *F16C 2326/02* (2013.01)

(58) Field of Classification Search
USPC 384/484–486, 480, 544, 589, 477; 277/353, 551, 562, 572, 560
See application file for complete search history.

(56) References Cited

U.S. PATENT DOCUMENTS

| | | | |
|---|---|---|---|
| 4,402,558 A * | 9/1983 | Olschewski et al. | 384/469 |
| 4,408,809 A * | 10/1983 | Walter et al. | 384/486 |
| 4,647,230 A * | 3/1987 | Friedrich et al. | 384/510 |
| 5,127,747 A * | 7/1992 | Hilby et al. | 384/448 |
| 5,454,647 A | 10/1995 | Otto | |
| 5,803,617 A | 9/1998 | Ohnuki et al. | |
| 6,485,188 B1 * | 11/2002 | Dougherty | 384/589 |
| 6,592,264 B2 | 7/2003 | Yabe et al. | |
| 7,021,830 B2 | 4/2006 | Takehara et al. | |
| 2007/0076994 A1 | 4/2007 | Norimatsu et al. | |
| 2007/0147718 A1 | 6/2007 | Takimoto | |
| 2007/0201781 A1 | 8/2007 | Adachi et al. | |
| 2007/0230853 A1 * | 10/2007 | Inoue et al. | 384/589 |
| 2007/0278748 A1 | 12/2007 | Matsui et al. | |
| 2008/0199120 A1 * | 8/2008 | Torii et al. | 384/480 |

FOREIGN PATENT DOCUMENTS

| | | |
|---|---|---|
| JP | 61-200704 | 12/1986 |
| JP | 6210103 U * | 1/1987 |
| JP | 6-59664 | 8/1994 |
| JP | 7-10631 | 2/1995 |
| JP | 07-034224 | 6/1995 |
| JP | 07-034225 | 6/1995 |
| JP | 07-034226 | 6/1995 |
| JP | 2001-165179 | 6/2001 |
| JP | 2001-510534 | 7/2001 |
| JP | 2001-289254 | 10/2001 |
| JP | 2003-148494 | 5/2003 |
| JP | 2003-148626 | 5/2003 |
| JP | 2003-222145 | 8/2003 |
| JP | 2003-254441 | 9/2003 |
| JP | 2005-061616 | 3/2005 |
| JP | 2005-147298 | 6/2005 |
| JP | 2005-233287 | 9/2005 |
| JP | 2005291485 A * | 10/2005 |

* cited by examiner (a)

(b)

(a)

(b)

(a)

(b)

WHEEL BEARING APPARATUS

CROSS-REFERENCE TO RELATED APPLICATIONS

This application is a divisional of U.S. patent application Ser. No. 11/542,561, filed Oct. 3, 2006, which claims priority to Japanese Patent Application Nos. 2005-291303, filed Oct. 4, 2005; 2005-291304, filed Oct. 4, 2005; 2005-327435, filed Nov. 11, 2005; and 2006-013805, filed Jan. 23, 2006. The disclosures of the above application are incorporated herein by reference.

FIELD

The present invention relates to a wheel bearing apparatus to rotatably support an automobile vehicle wheel relative to a suspension apparatus and, more particularly, to a wheel bearing apparatus intended to increase the sealability and durability of seals mounted on a bearing portion in order to improve the life of bearing.

BACKGROUND

Wheel bearing apparatus to support a vehicle wheel is an apparatus to rotatably support a wheel mounting wheel hub, via double row rolling bearings, for driving wheels and driven wheels. For structural reasons, in general, a bearing of an inner ring rotation type is used for driving wheels. Both inner ring rotation and outer ring rotation types are used for driven wheels. In general, the wheel bearing apparatus is classified into a so-called first-generation type where the wheel bearing includes double row angular ball bearings fit between a knuckle and a wheel hub. A second-generation type is where the body mounting flange or the wheel mounting flange is directly formed on the outer circumferential surface of the outer member. A third generation type is where one of inner raceway surfaces is formed directly on the outer circumferential surface of the wheel hub. A fourth generation type is where an inner raceway surface is formed directly on the outer circumferential surface of the outer joint member of the wheel hub and the constant velocity universal joint, respectively.

In the bearing portion of these wheel bearing apparatus, seals are provided to prevent leakage of grease contained within the bearing as well as to prevent ingress of rain water or dust into the bearing. Recently, the automobile industry has moved toward maintenance-free bearings and thus requires the bearing to have a longer life. Investigation into the cause of damages to the bearing has yielded that a substantial part of the cause of damage is due to trouble with the seal of the bearing rather than the primary cause such as delamination of the bearing surface. Accordingly, the life of a bearing apparatus can be improved by improving the sealability and durability of the bearing apparatus.

Various seals for wheel bearing apparatus have been proposed, one example is shown in FIG. 15. This wheel bearing apparatus is of a so-called third generation type for a driven wheel. It includes an outer member 101 integrally formed on its outer circumferential surface with a body mounting flange 101b, to be mounted on a knuckle (not shown) of a vehicle. Its inner circumferential surface is formed with double row outer raceway surfaces (101a, 101a). An inner member, including a wheel hub 103, has a wheel mounting flange 102 integrally formed at one end. One 103a of double row inner raceway surfaces (103a, 104a) is arranged opposite to the double row outer raceway surfaces (101a, 101a). A cylindrical portion 103b axially extends from the inner raceway surface 103a. A threaded portion 103c is formed on the end of the cylindrical portion 103b. An inner ring is fit onto the cylindrical portion 103b of the wheel hub 103. Its outer circumferential surface is formed with the other one 104a of double row inner raceway surfaces (103a, 104a). Double row rolling elements (balls) 107, 107 are rollably arranged between the outer and inner raceway surfaces, via cages 106.

Hub bolts 102a are mounted on the wheel mounting flange 102 equidistantly apart from each other along the periphery. A securing nut 108 is fastened to the end of the wheel hub 103 to axially immovably secure the inner ring 104 relative to the wheel hub 103. In addition, a seal 109 is mounted between the outer-side end of the outer member 101 and the wheel hub 103. A cap (not shown) is mounted on the inner-side end of the outer member 101 to prevent leakage of grease contained within the bearing, as well as ingress of rain water or dust into the bearing.

As shown in an enlarged view in FIG. 16, the seal 109 has a metal core 110 and a sealing member 111 integrated with the metal core 110 by vulcanized adhesion. The metal core 110 has a cylindrical press fitting portion 112 to be fit into the outer member 101. An inner portion 113 of the metal core 110 is bent at the axially inner end of the press fitting portion 112 to extend radially inward from it. An outer portion 114 extends upward from the axially outer end of the press fitting portion 112. The outer portion 114 is arranged to be in contact with the outer-side end of the outer member 101.

The sealing member 111 is formed of an elastic material such as synthetic resin. The sealing member 111 is adhered to the metal core 110 over a range from a portion of the outer-side surface of the outer portion 114 of the metal core 110 to a tip of the inner portion 113 of the metal core 110. The sealing member 111 further extends to the inner-side surface of the inner portion 113 and surrounds the tip.

The sealing member 111 is provided with two side lips 115, 116. The lips 115, 116 are inclined and extend radially outward to contact a surface of the base of the wheel mounting flange 102 when the seal 109 is assembled on the bearing apparatus. In addition, a radial lip 117 is arranged at the tip of the inner portion 113 of the metal core 110. The tip 117 is bent to contact with a round corner portion 118 at the base of the wheel mounting flange 102 when the seal 109 is assembled on the wheel bearing apparatus.

In such a structure of the seal 109, the rain water or dust coming into the wheel bearing apparatus will flow or be gathered in a groove formed by the radially outermost side lip 115 and flow downward. The radially inner side lip 116 can prevent slight rain water or dust which would passed through the radially outermost side lip 115 from entering into the bearing. In addition the radial lip 117 can prevent grease contained in the bearing from flowing out from the bearing. Although there would be variation in axial interference of the sealing member 111 against the wheel hub 103, the two side lips 115, 116 will exhibit high sealing performance due to their flexible deformation. The seal 109 is also designed in a compact and slim configuration so as to be adapted to a small space near the rounded portion 118 of the base of the wheel mounting flange 102. A Reference patent document is Japanese Laid-open Utility model Publication No. 34224/1995.

The seal 109 of the prior art wheel bearing apparatus has a groove feature on its outer circumferential surface which rain water or dust gather and flow downward to be discharged from the seal 109. Sometimes a problem occurs in that muddy water enters into the narrow space between the wheel hub 103 and the outer member 101. The muddy water solidifies after it dries and thus flexible deformation of the side lip 115 is prevented. If the flexible deformation of the side lip 115 is suppressed, wear of the side lip 115 is accelerated by dust or sand adhered to the tip of the lip 115. Thus, the sealability of the seal 109 is spoiled. In addition, since the end surface of the outer member 101 and the outer portion 114 of the metal core 110 directly contacts with each other, via metal-to-metal contact, corrosion is accelerated by rain water entering therebetween and thus the sealability is also spoiled.

SUMMARY

It is an object of the present disclosure to provide a wheel bearing apparatus intended to increase the sealability and durability of the seals mounted on a bearing portion in order to improve the life of the bearing.

According to the present disclosure, a wheel bearing apparatus comprising an outer member formed with double row outer raceway surfaces on its inner circumferential surface. An inner member includes a wheel hub having a wheel mounting flange integrally formed at one end. A cylindrical portion axially extends from the wheel mounting flange. At least one inner ring is fit onto the cylindrical portion of the wheel hub. The inner ring is formed with double row inner raceway surfaces on its outer circumferential surface. The double row inner raceway surfaces are arranged opposite to the double row outer raceway surfaces. Double row rolling elements are rollably arranged between the outer and inner raceway surfaces via cages. A seal is mounted on one end of the outer member. The seal has integrally formed side lips adapted to be in sliding contact on the wheel hub. The base of the wheel mounting flange is formed with a curved surface in a cross-section of a circular arc. The seal has three side lips each inclined and extending radially outward from the seal body. The side lips are adapted to be in sliding contact on the base of the wheel mounting flange. The interference of the side lips against the base of the wheel mounting flange is set so that the radially inner side lip has a smaller interference than that of the radially outer side lips, in order.

Since the base of the wheel mounting flange is formed as a curved surface in cross-section of a circular arc, the seal has three side lips each inclined and extending radially outward from the seal body. The lips are adapted to slidingly contact with the base of the wheel mounting flange. The interference of the side lips against the base of the wheel mounting flange is set so that the radially innermost side lip has a smaller interference than that of the radially outer side lips, in order. Thus, it is possible to set the sealing torque within a pertinent range by suppressing it and to improve the durability of the seal by varying the wear rate of the respective lips in order to obtain stable sealability for a long term.

Since the radially outermost side lip is inclined and extends radially outward from a position of the outer circumferential surface of the outer member, rain water or dust gathered on the radially outermost side lip can flow from its inclined surface toward the outer member. Further, it can flow downward along the bottom outer circumferential surface of the radially outermost side lip and finally drop off of the lip. Accordingly, muddy water or dust does not reside on the tip of the lip and thus it is possible to maintain high sealability.

Since the side lips have lengths different from one another, and the radially outermost side lip is longer and wider than the other side lip(s), the lip rigidity is increased. Thus, the tip of the lip cannot be sucked radially inward if the pressure inside the radially outermost lip becomes negative and cause a pressure difference across the lip.

Since the base of the radially innermost one of the side lips is formed with a radial lip extending radially inward and it is adapted to contact the wheel hub or the inner ring, it is possible to prevent leakage of the grease contained within the bearing.

The seal is comprised of a metal core press formed from sheet steel and the sealing member forming the side lips. The metal core has a cylindrical fitting portion to be fit into the inner circumferential surface of the outer-side end of the outer member. An outer portion extends from the fitting portion along the end face of the outer member to a position corresponding to the outer circumferential surface of the outer member. The outer portion of the metal core is surrounded by the sealing member so that the sealing member is interposed between the metal core and the outer member when the seal is arranged in position. Thus, the direct metal-to-metal contact between the metal core and the outer member can be prevented. Accordingly, it is possible to improve the sealability between the two and to prevent the generation of corrosion which improves the durability of the wheel bearing apparatus.

A wheel bearing apparatus comprises an outer member formed with double row outer raceway surfaces on its inner circumferential surface. An inner member includes a wheel hub having a wheel mounting flange integrally formed at one end and a cylindrical portion axially extending from the wheel mounting flange. At least one inner ring is fit onto the cylindrical portion of the wheel hub. The inner ring is formed with double row inner raceway surfaces on its outer circumferential surface. The double row inner raceway surfaces are arranged opposite to the double row outer raceway surfaces. Double row rolling elements are rollably arranged between the outer and inner raceway surfaces, via cages. A seal is mounted on one end of the outer member. The seal has integrally formed side lips adapted to be in sliding contact with the wheel hub. The seal comprises a first seal fit onto the inner circumferential surface of the end of the outer member. The seal has a plurality of integrally formed side lips adapted to slidingly contact the wheel hub. A second seal is fitted on the outer circumferential surface of the end of the outer member. The second seal has a side lip adapted to slidingly contact the wheel hub. The side lip of the second seal is formed on an incline so that it extends radially outward from its base to its tip.

The seal comprises a first seal fit onto the inner circumferential surface of the end of the outer member with a plurality of integrally formed side lips adapted to slidingly contact the wheel hub. The second seal is fit onto the outer circumferential surface of the end of the outer member with a side lip adapted to slidingly contact the wheel hub. The side lip of the second seal is inclined and formed so that it extends radially outward from its base to its tip. Accordingly, direct ingress of muddy water or dust into the first seal is prevented. Thus, the sealability can be improved. In addition since residence of muddy water on the outer surface of the side lip and thus the generation of corrosion between the outer member and the wheel hub can be prevented, it is possible to provide a wheel bearing apparatus which can exhibit an extended life of the bearing.

The second seal comprises a metal core press formed from steel sheet with corrosion resistance. A sealing member is integrally adhered on the metal core by vulcanized adhesion. The metal core comprises a cylindrical portion fit onto the outer circumferential surface of the end of the outer member. A standing portion extends radially outward from the cylindrical portion. The side lip is inclined and extends radially outward from the outer circumferential edge of the standing portion. Thus, the durability of the metal core can be improved. In addition, rain water or dust can easily flow from the inclined outer surface of the side lip toward the outer member. Thus, the rain and dust does not reside in the contacting point of the side seal to the wheel hub which, in turn, improves the durability of the sealing member.

Since the outer circumferential surface of the end of the outer member is formed with a diameter smaller than that of the body of the outer member, via a tapered surface therebetween, rain water or dust gathered on the radially outermost side lip can flow from its inclined surface toward the outer member. Further, it can flow downward along the bottom outer circumferential surface of the radially outermost side lip and finally drop off from the lip. Accordingly, muddy water or dust does not reside or stay on the tip of the lip. Thus, it is possible to maintain high sealability.

Since the sealing member of the second seal is secured on the surface of the cylindrical portion of the metal core with the sealing member surrounding the cylindrical portion, the direct metal-to-metal contact between the metal core and the outer member can be prevented. Thus, it is possible to improve the sealability and to prevent the generation of corrosion. This improves the durability of the wheel bearing apparatus.

Since the base of the radially innermost one of the side lips is formed with a radial lip that extends radially inward and is adapted to contact the wheel hub or the inner ring, it is possible to prevent leakage of the grease contained within the bearing.

A wheel bearing apparatus comprises a wheel hub with a wheel mounting flange integrally formed at one end. A cylindrical portion axially extends from the wheel mounting flange, via a shoulder portion. A wheel bearing is press fit onto the cylindrical portion of the wheel hub with the end face of the wheel bearing abutting the shoulder portion of the wheel hub. The wheel bearing includes an outer member formed with double row outer raceway surfaces on its inner circumferential surface. A pair of inner rings, each formed with an inner raceway surface, is arranged opposite to one of the double row outer raceway surfaces. Double row rolling elements are rollably arranged between the outer and inner raceway surfaces, via cages. Seals are mounted in annular spaces formed between the outer member and the inner ring. At least an outer-side seal of the seals comprises an annular sealing plate having a substantially "L" shaped cross-section and is adapted to be fit in the outer member. A slinger, having a substantially "L" shaped cross-section, is adapted to be fit on the inner ring and is arranged opposite to the sealing plate. The sealing plate has integrally formed side lip(s) adapted to be in sliding contact with the slinger. A side lip is adapted to slidingly contact with the wheel hub via predetermined interface at a position radially outward of the sealing plate and outside the bearing space. A lip member, contacting the wheel hub, is mounted on the outer surface of the slinger.

In the wheel bearing apparatus of the first generation type or the second generation type, where the seal is arranged in the annular space formed between the outer member and the pair of inner rings, at least an outer-side seal of the seals comprises an annular sealing plate with a substantially "L" shaped cross-section and is adapted to be fit into the outer member. A slinger, having a substantially "L" shaped cross-section, is adapted to be fit onto the inner ring and arranged opposite to the sealing plate. The sealing plate has integrally formed side lip(s) adapted to be in sliding contact with the slinger. One side lip is adapted to be in sliding contact with the wheel hub, via a predetermined interface at a position radially outward of the sealing plate and outside the bearing space. A lip member, contacting the wheel hub, is mounted on the outer surface of the slinger. Thus, it is possible to prevent ingress of abraded matter generated by fretting between the shoulder of the wheel hub and the end of the inner ring into the seal. Accordingly, wear of the side lip caused by the abraded matter immigrated into the sliding contact surfaces can be prevented. Thus, it is possible to provide a wheel bearing apparatus which has high sealability and durability and exhibits an extended life of the bearing.

The side lip slidingly contacting the wheel hub may be mounted on another outer seal separate from the seal mounted on the outer circumferential surface of the outer member. Also, the side lip slidingly contacting the wheel hub may be integrally mounted with the sealing plate.

Since the side lip slidingly contacting the wheel hub is inclined radially outward, the wheel bearing apparatus can exhibit high sealability.

Since the slinger comprises a cylindrical portion, press fit into the inner ring, a standing portion, extending radially outward from the cylindrical portion, and a flange portion, further axially extending from the standing portion, and the lip member is formed integrally with the flange portion, it is possible to easily insert a press fitting jig into the standing portion during press fitting of the slinger into the inner ring and thus achieving easy assembly of the wheel bearing apparatus.

A wheel bearing apparatus comprises an outer member having a body mounting flange integrally formed on its outer circumferential surface. Double row outer raceway surfaces are formed on its inner circumferential surface. An inner member includes a wheel hub with a wheel mounting flange integrally formed at one end and a cylindrical portion axially extending from the wheel mounting flange. An inner ring is fit onto the cylindrical portion of the wheel hub or an outer joint member of a constant velocity universal joint. Double row inner raceway surfaces are formed on the outer circumferential surface of the inner member. The double row inner raceway surfaces are adapted to be arranged opposite to the double row outer raceway surfaces. Double row rolling elements are rollably arranged between the outer and inner raceway surfaces, via cages. Seals are mounted in annular spaces formed between the outer member and the inner member. A backup seal, having an inclined integrally formed sealing lip extending radially outward, is mounted on the outer circumferential surface of the outer-side end of the outer member. An annular disc shaped metal ring, on which the sealing lip sliding contacts, is mounted on the inner-side surface of the wheel mounting flange. The metal ring is formed of sheet steel and has corrosion resistance.

The backup seal has an integrally formed sealing lip which is inclined and extends radially outward. The backup seal is mounted on the outer circumferential surface of the outer-side end of the outer member. An annular disc shaped metal ring, on which the sealing lip sliding contacts, is mounted on the inner-side surface of the wheel mounting flange. The metal ring is formed of sheet steel which has corrosion resistance. Direct ingress of muddy water or dust into the first seal is prevented and thus sealability is improved. In addition since residence of muddy water on the outer surface of the side lip and thus the generation of corrosion between the outer member and the wheel hub can be prevented, it is possible to provide a wheel bearing apparatus which can maintain bearing performance for a long term.

The sealing lip may be an inclined side lip extending radially outward like a horn configuration. The sealing lip may be an inclined side lip extending radially outward toward the inner-side direction. The metal ring comprises a disc portion mounted on the side surface of the wheel mounting flange. A cylindrical portion axially extends from the disc portion where the radial lip slidingly contacts.

If the annular ring has a predetermined surface hardness and surface roughness, it is possible to obtain an excellent sealing slide surface only by mounting the annular ring on the wheel mounting flange. Thus, this suppresses wear of the metal ring and lip. Accordingly, high sealability can be maintained for a long term.

Since an elastic member is interposed between the metal ring and the wheel mounting flange, it is possible to increase adhesion therebetween.

A wheel bearing apparatus comprises an outer member formed with double row outer raceway surfaces on its inner circumferential surface. An inner member includes a wheel hub with a wheel mounting flange integrally formed at one end and a cylindrical portion axially extending from the wheel mounting flange. One pair of inner rings is fit onto the cylindrical portion of the wheel hub. The inner rings are formed with double row inner raceway surfaces on its outer circumferential surface. The double row inner raceway surfaces are arranged opposite to the double row outer raceway surfaces. Double row rolling elements are rollably arranged between the outer and inner raceway surfaces, via cages. A seal is mounted on one end of the outer member. The seal has integrally formed side lips adapted to slidingly contact with the wheel hub. The base of the wheel mounting flange is formed to have a curved surface in cross-section of a circular arc. The seal has three inclined side lips each extending radially outward from the seal body and each adapted to be in sliding contact with the base of the wheel mounting flange. The interference of the side lips against the base of the wheel mounting flange is set so that the radially inner side lip has a smaller interference than that of the radially outer side lips, in order. The inclined radially outermost side lip extends radially outward from a position of the outer circumferential surface of the outer member.

A wheel bearing apparatus comprises an outer member formed on its inner circumferential surface with double row outer raceway surfaces. An inner member includes a wheel hub with a wheel mounting flange integrally formed at one end and a cylindrical portion axially extending from the wheel mounting flange. One pair of inner rings is fit onto the cylindrical portion of the wheel hub. The pair is formed with double row inner raceway surfaces on its outer circumferential surface. The double row inner raceway surfaces are arranged opposite to the double row outer raceway surfaces. Double row rolling elements are rollably arranged between the outer and inner raceway surfaces, via cages. A seal is mounted on one end of the outer member. The seal has integrally formed side lips adapted to slidingly contact with the wheel hub. The base of the wheel mounting flange is formed as a curved surface in cross-section along a circular arc. The seal has three inclined side lips each extending radially outward from the seal body and each adapted to be in sliding contact with the base of the wheel mounting flange. The interference of the side lips against the base of the wheel mounting flange is set so that the radially innermost side lip has a smaller interference than that of the radially outer side lips, in order. The inclined radially outermost side lip extends radially outward from a position of the outer circumferential surface of the outer member.

A wheel bearing apparatus comprises a wheel hub with a wheel mounting flange integrally formed at one end and a cylindrical portion axially extending from the wheel mounting flange, via a shoulder portion. A wheel bearing is press fit onto the cylindrical portion of the wheel hub with the end face of the wheel bearing abutting the shoulder portion of the wheel hub. The wheel bearing includes an outer member formed with double row outer raceway surfaces on its inner circumferential surface. A pair of inner rings, each formed on its outer circumferential surface with an inner raceway surface, is arranged opposite to one of the double row outer raceway surfaces. Double row rolling elements are rollably arranged between the outer and inner raceway surfaces, via cages. Seals are mounted in annular spaces formed between the outer member and the inner ring. At least an outer-side seal of the seals comprises an annular sealing plate having a substantially "L" shaped cross-section and is adapted to be fit into the outer member. A slinger, having a substantially "L" shaped cross-section, is adapted to be fit onto the inner ring and arranged opposite to the sealing plate. The sealing plate has integrally formed side lip(s) adapted to be in sliding contact with the slinger. An external seal, separate from the first seal, is mounted on the outer circumferential surface of the end of the outer member. A side lip is adapted to be a sliding contact with the wheel hub via a predetermined interface. The side lip is mounted on the external seal. A lip member, contacting the wheel hub, is mounted on the outer surface of the slinger.

A wheel bearing apparatus comprises a wheel hub with a wheel mounting flange integrally formed at one end and a cylindrical portion axially extending from the wheel mounting flange. A wheel bearing is press fit onto the cylindrical portion of the wheel hub. The wheel bearing includes an outer member with an integrally formed body mounting flange on its outer circumferential surface. The flange is adapted to be mounted on a suspension apparatus of a vehicle. The outer member is formed with double row outer raceway surfaces on its inner circumferential surface. A pair of inner rings, each formed with an inner raceway surface on its outer circumferential surface, is arranged opposite to one of the double row outer raceway surfaces. Double row rolling elements are rollably arranged between the outer and inner raceway surfaces, via cages. Seals are mounted in annular spaces formed between the outer member and the inner ring. The inner rings are axially secured by a caulked portion formed by plastically deforming the end of the cylindrical portion radially outward. A backup seal, having an integrally formed inclined side lip extending radially outward and having a horn-shaped configuration, is mounted on the outer circumferential surface of the outer-side end of the outer member. An annular disc shaped metal ring, on which the sealing lip sliding contacts, is mounted on the inner-side surface of the wheel mounting flange, via securing bolts. The metal ring is press formed of sheet steel and has corrosion resistance.

Further areas of applicability will become apparent from the description provided herein. It should be understood that the description and specific examples are intended for purposes of illustration only and are not intended to limit the scope of the present disclosure.

DRAWINGS

Additional advantages and features of the present invention will become apparent from the subsequent description and the appended claims, taken in conjunction with the accompanying drawings, wherein:

FIG. 7 (b) is a partially enlarged sectional view of FIG. 7 (a).

FIG. 8 (b) is a partially enlarged sectional view of FIG. 8 (a).

FIG. 9 (b) is a partially enlarged sectional view of a modified embodiment of FIG. 9 (a).

DETAILED DESCRIPTION

Preferred embodiments of the present invention will be described with reference to accompanied drawings.

Figure 1:
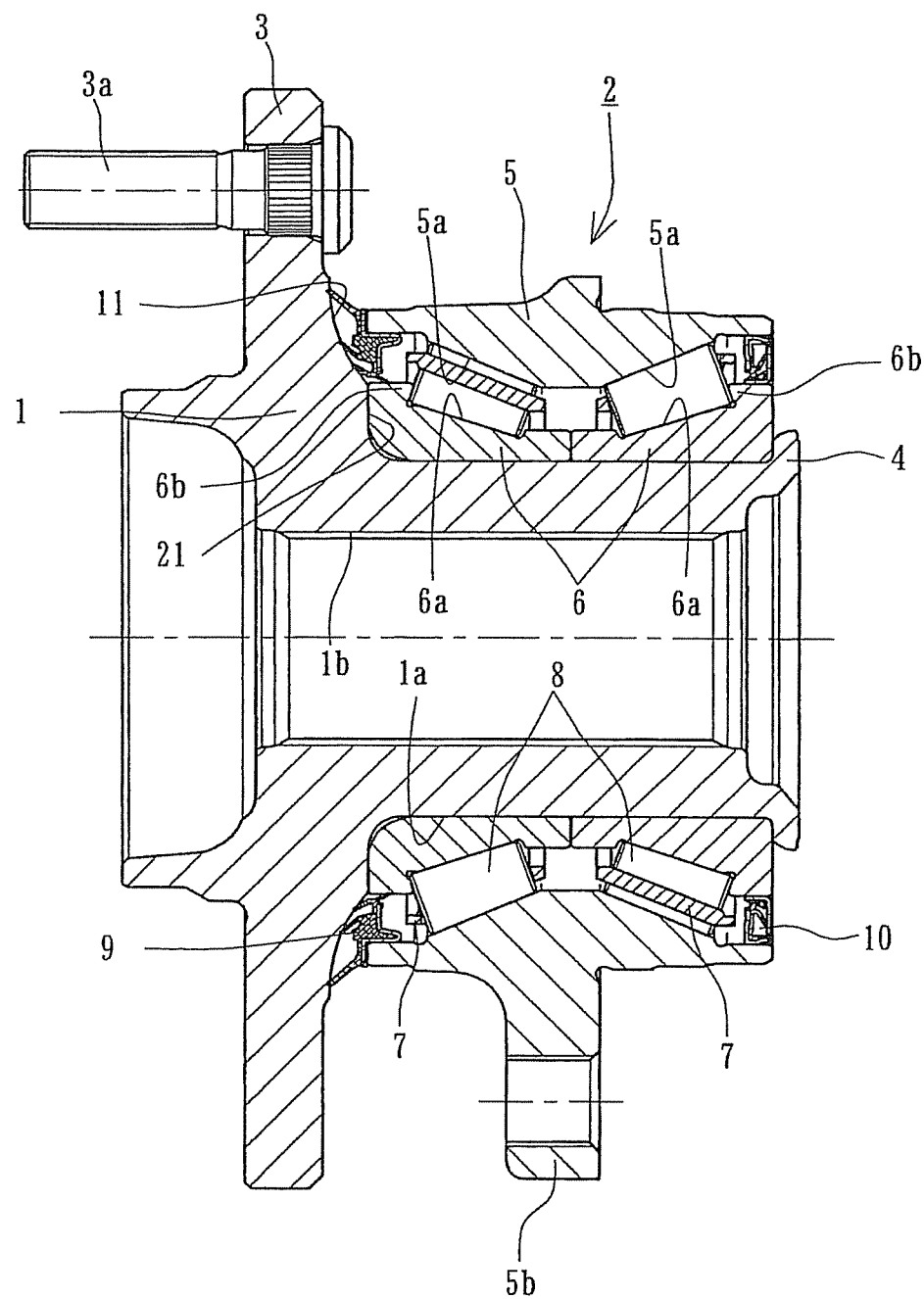
FIG. 1 is a longitudinal-section view of a first embodiment of a wheel bearing apparatus.
Figure 2:
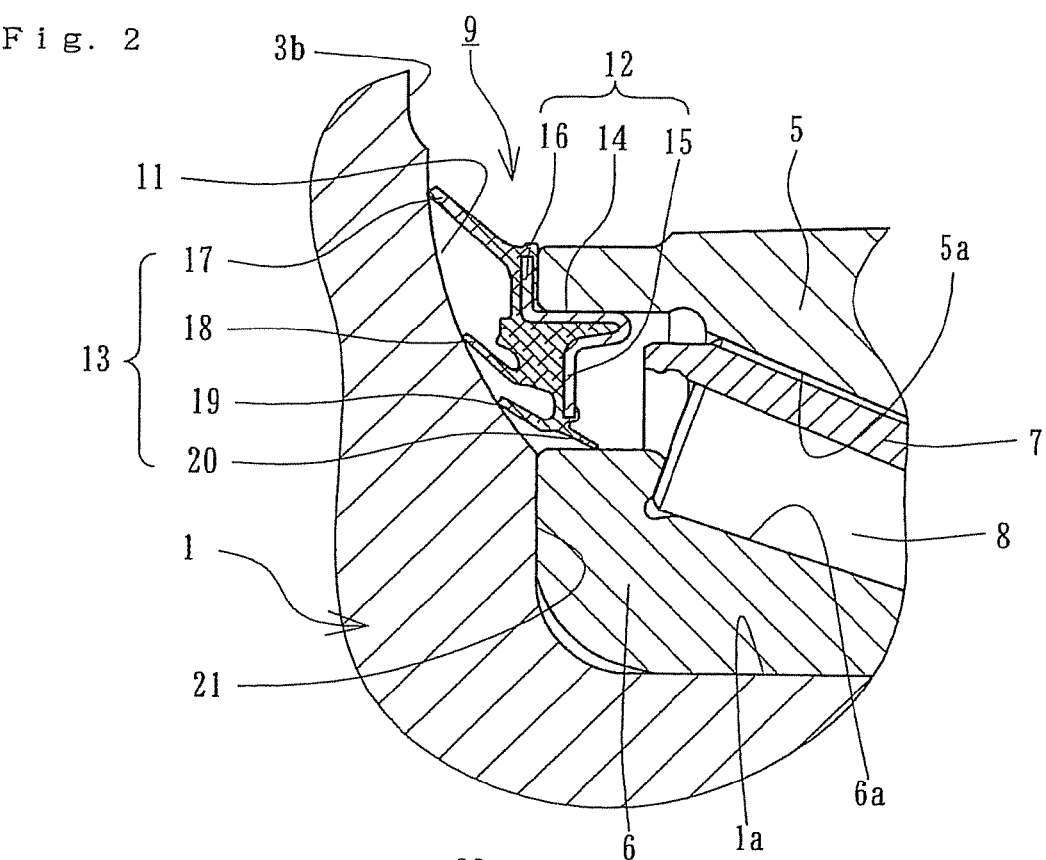
FIG. 2 is a partially enlarged sectional view of FIG. 1.
Figure 3:
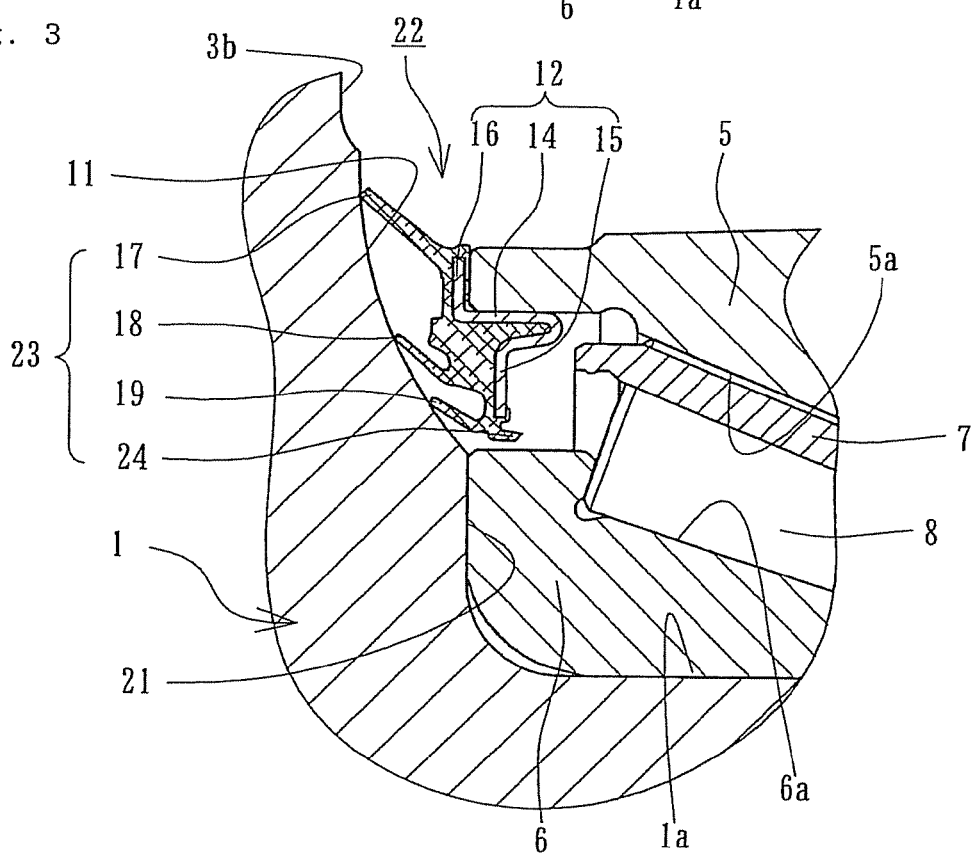
FIG. 3 is a partially enlarged sectional view of a modified embodiment of FIG. 2.

FIG. 1 is a longitudinal-section view of a first embodiment of a wheel bearing apparatus. FIG. 2 is a partially enlarged sectional view of FIG. 1. FIG. 3 is a partially enlarged sectional view of a modified embodiment of FIG. 2. In the description below, a term "outer-side" of the wheel bearing apparatus denotes a side which is positioned outside of the vehicle body. The term "inner-side" of the wheel bearing apparatus denotes a side which is positioned inside of the vehicle body when the wheel bearing apparatus is mounted on the vehicle body.

The wheel bearing apparatus of FIG. 1 is that used for a driving wheel and has a so-called "second generation" structure. The apparatus includes a wheel hub 1 and a wheel bearing 2 fit onto the wheel hub 1. The wheel hub 1 is integrally formed with a wheel mounting flange 3 and has a cylindrical portion 1a axially extending from the wheel mounting flange 3. The cylindrical portion 1a is formed with a serration (or spline) 1b on its inner circumferential surface. Hub bolts 3a are mounted equidistantly along the periphery of the wheel mounting flange 3. The wheel bearing 2 is press fit onto the cylindrical portion 1a of the wheel hub 1 via a predetermined interference. The wheel bearing 2 is secured in an axial direction by a caulked portion 4 formed by plastically deforming the end of the cylindrical portion 1a.

The wheel hub 1 is made of medium carbon steel such as S53C which includes carbon of 0.40~0.80% by weight. The wheel hub 1 is formed with a hardened layer having a surface hardness of 58~64 HRC by high frequency induction hardening. The hardened layer extends from the base 11 of the wheel mounting flange 3, to form a seal land portion for an outer-side seal 9, to the cylindrical portion 1a. The caulked portion 4 is not hardened and remained as is after forging.

The wheel mounting bearing 2 includes an outer member 5 with an integrally formed body mounting flange 5b and with tapered double row outer raceway surfaces 5a, 5a formed on its inner circumferential surface. A pair of inner rings 6, 6 is each formed with tapered inner raceway surface 6a on its outer circumferential surface. The inner raceway surface 6a corresponds to each of the double row outer raceway surfaces 5a, 5a. Double row rolling elements (tapered rollers) 8, 8 are rollably contained, via cages 7, 7, between the outer and inner raceway surfaces 5a, 6a. A large flange 6b is formed on a larger diameter end of each inner ring 6. The rolling elements 8 are guided by the large flange 6b so that the rolling elements 8 roll on the inner raceway surface 6a. The pair of the inner rings 6, 6 is arranged on the cylindrical portion 1a so that their smaller diameter ends abut each other to form a double row tapered roller bearing of a so-called back-to-back duplex bearing.

The outer member 5 is made of medium carbon steel such as S53C, which includes carbon of 0.40~0.80% by weight, or of high carbon chrome bearing steel such as SUJ2. At least the double row outer raceway surfaces 5a, 5a are hardened to have surface hardness of 58~64 HRC by high frequency induction hardening. In case of high carbon chrome bearing steel, the outer member 5 is hardened to its core by dip hardening to have a hardness of 58~64 HRC. The inner ring 6 and the rolling elements 8 are made of high carbon chrome bearing steel such as SUJ2 or blister steel and hardened to their core by dip hardening to have a hardness of 58~64 HRC. In case of blister steel, they are surface hardened to have a hardness of 58~64 HRC.

Seals 9, 10 are arranged at both ends of the outer member 5 to seal an annular space formed between the outer member 5 and the inner rings 6, 6. The seals prevent leakage of lubricating grease contained within the bearing and ingress of rain water or dust into the bearing.

As shown in an enlarged view of FIG. 2, the outer-side seal 9 of the seals 9, 10 includes a metal core 12 and a sealing member 13 integrally adhered to the metal core 12 via vulcanized adhesion. The metal core 12 includes a cylindrical fitting portion 14 to be fit onto the inner circumferential surface of the end of the outer member 5. Inner portion 15 is bent from the fitting portion 14 and extends radially inward. An outer portion extends from the fitting portion 14 to the outer circumferential surface of the outer member 5 along its end surface. The metal core 12 is made by press forming of austenitic stainless steel sheet (JIS SUS 304 etc.) or preserved cold rolled sheet (JIS SPCC etc.).

The sealing member 13 is made of synthetic rubber, such as nitrile rubber. The sealing member 13 is adhered to the metal core 12 in a region from the outer surface of the outer portion 16 to the innermost end of the inner portion 15 and further extends beyond the innermost end to the inner surface of the inner portion 15 to surround the innermost end of the inner portion 15 and to further extend to its inner surface. The sealing member 13 has three side lips 17, 18, 19 and a radial lip 20. The radial lip 20 extends radially inward from the base of the innermost side lip 19. The side lips 17, 18, 19 have different length and are inclined and extend radially outward. The radially outermost side lip 17 extends from the outer surface of the outer portion 16 and is set to have the longest length and widest width. Other side lips 18, 19 are set to have a shorter length and a smaller width, in order, as they move radially inward. According to such a structure, the radially outermost inclined side lip 17 is formed so that it extends from the outer circumferential portion of the outer member 5. Thus, rain water or dust gathered on the side lip 17 can flow along the inclined outer surface of the side lip 17 toward the outer member 5. Accordingly, it can be dropped out or off from the bottom of the side lip 17 or the outer member 5. Thus, rain water or dust does not remain in the sliding contact region at the tip of the side lip 17. Accordingly, high sealability can be obtained. In addition since the radially outermost side lip 17 is longer and wider than the other side lip 18, 19, the rigidity of the side lip 17 is increased. Thus, the tip of the lip 17 cannot be sucked radially inward if the pressure inside the lip 17 become negative and a pressure difference is caused across the lip 17.

The base 11 of the wheel mounting flange 3 is formed to have a circular arc cross-section upstanding from a shoulder portion where the larger end face of the inner ring 6 abuts and then continues gradually to the flange side surface 3b. The three side lips 17, 18, 19 sliding contact the circular arc base 11 of the wheel mounting flange 3 with a predetermined interference. The interference of each side lip 17, 18, 19 is set so that the radially outermost side lip 17 is largest and gradually reduces, in order, toward the radially inner side lip 18, 19. With changing the interference of the side lips 17, 18, 19 between radially outer and inner ones, it is possible to suppress the sealing torque and to set it in a pertinent range. In addition, it is possible to improve the sealing durability and to obtain stable sealability for a long term by changing the wear rate of respective lips. The radial lip 20 is inclined radially inward toward the inner-side and slidingly contacts the outer circumferential surface of the inner ring 6, via a predetermined interface, to prevent leakage of grease contained within the bearing.

As previously described, the outer portion 16 of the metal core 12 is extended along the end face of the outer member 5 to its outer circumferential surface. The sealing member 13 surrounds the surface of the outer portion 16. Thus, the sealing member 13 is interposed between the metal core 12 and the outer member 5 when the seal 9 is assembled to the outer member 5. Accordingly, direct metal-to-metal contact between the metal core 12 and the outer member 5 is prevented. Thus, the sealability between the two can be improved and the generation of corrosion at a contact region between the two can be prevented. Such a structure of the outer-side seal 9 can improve the sealability and the durability of the seal 9. Thus, it is possible to provide a wheel bearing apparatus which exhibits long life.

Although the double row tapered roller bearing is shown using tapered rollers as the rolling elements 8 of the wheel bearing 2, the present invention is not limited to such an embodiment. Thus, a double row angular ball bearing using balls as the rolling elements 8 as well as bearing using balls and tapered roller as the rolling elements 8 may also be used. In addition, the wheel bearing apparatus can be applied not only to the illustrated second generation type but to the first generation type, the third generation type and the fourth generation type of bearing structure if the bearing is an inner ring rotation type.

FIG. 3 is a partially enlarged sectional view showing a modification of FIG. 2. The same reference numerals are used as those used in the first embodiment to designate the same structural elements in this modified embodiment.

The outer-side seal 22 includes the metal core 12 and a sealing member 23 integrally adhered to the metal core 12, via vulcanized adhesion. The sealing member 23 is made of synthetic rubber such as nitrile rubber. The sealing member 23 is adhered to the metal core 12 in a region from the outer surface of the outer portion 16 to the innermost end of the inner portion 15 and further extends beyond the innermost end to the inner surface of the inner portion 15 to surround the innermost end of the inner portion 15 and to further extend to its inner surface.

The sealing member 23 has three side lips 17, 18, 19 and a radial lip 24. The radial lip 24 extends radially inward from the base of the innermost side lip 19. The radial lip 24 is formed so that it extends toward the inner-side of the bearing. The radial lip 24 is arranged so as to oppose the outer circumferential surface of the inner ring 6 via a slight radial distance. This forms a labyrinth seal therebetween. This structure makes it possible to reduce the sealing torque and to improve fuel consumption as well as to improve the seal durability while suppressing an increase in temperature at lip sliding contact portion.

Figure 4:
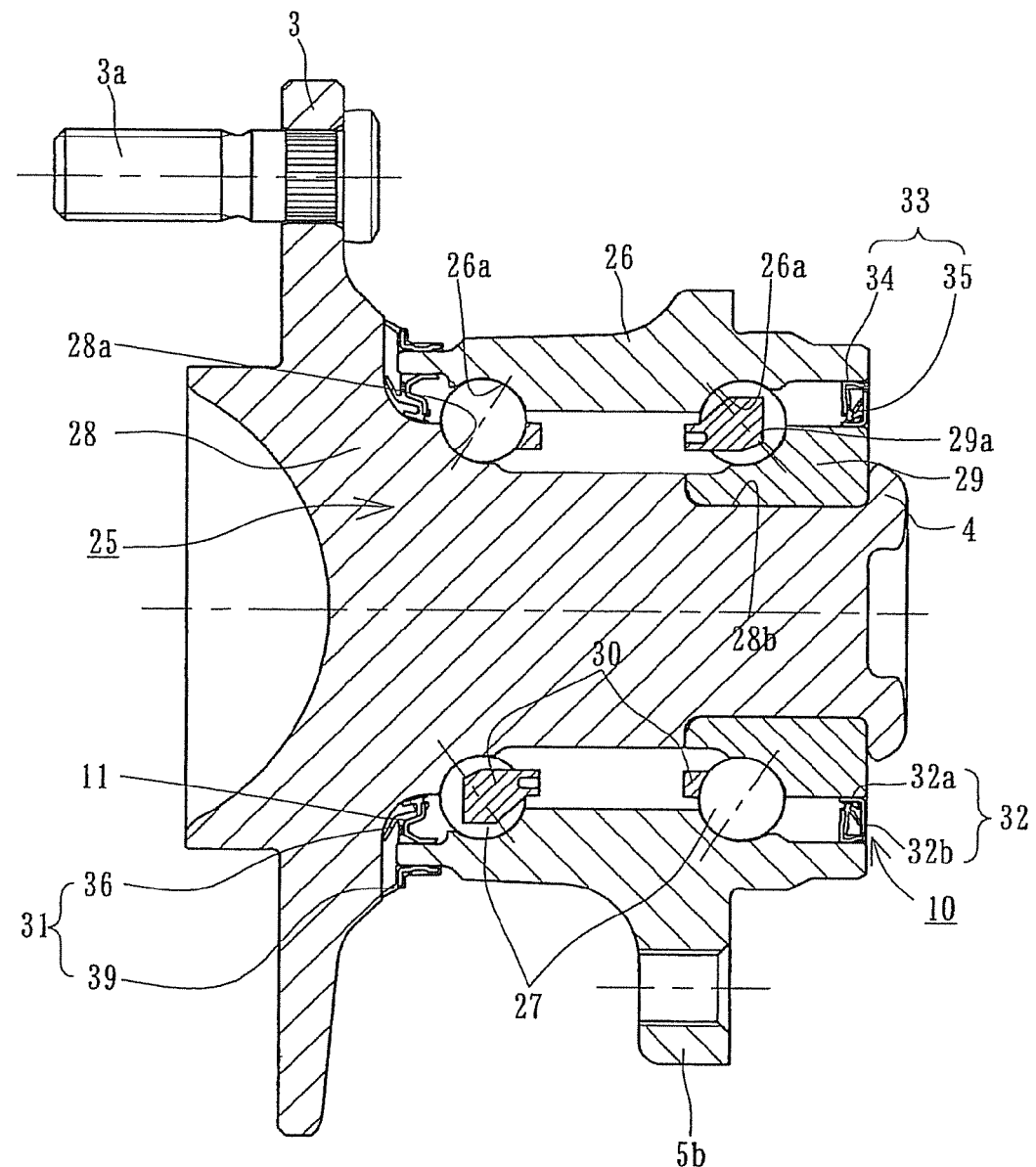
FIG. 4 is a longitudinal-section view of a second embodiment of a wheel bearing apparatus.
Figure 5:
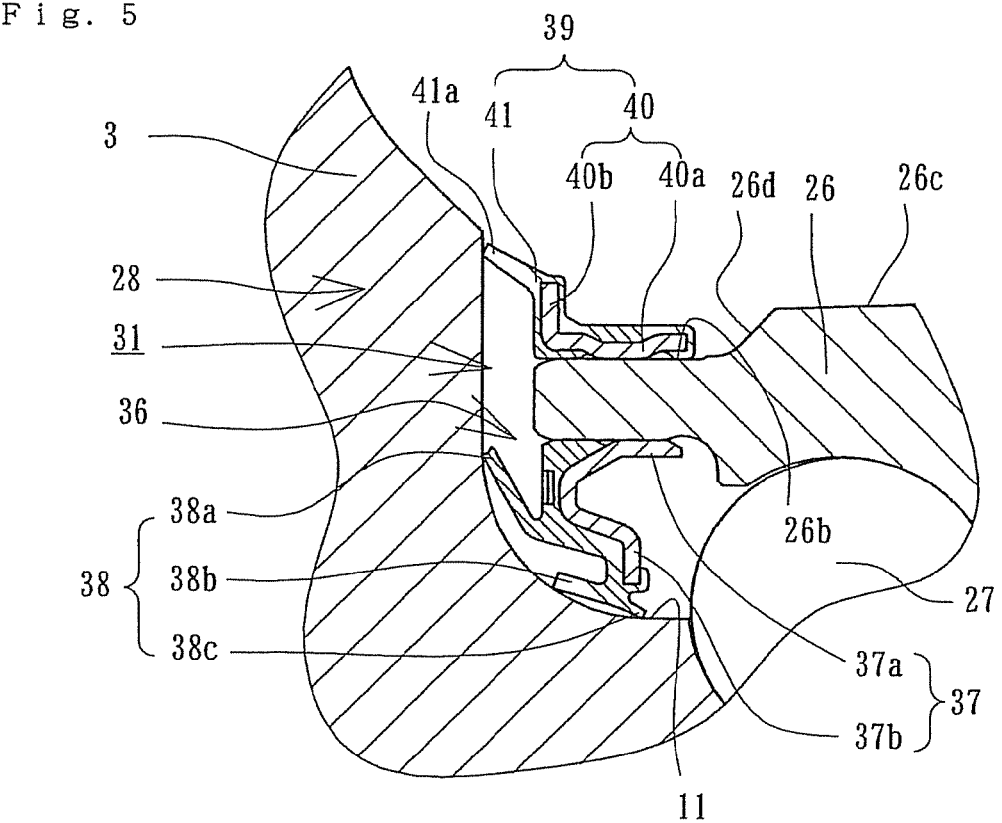
FIG. 5 is a partially enlarged sectional view of FIG. 4.
Figure 6:
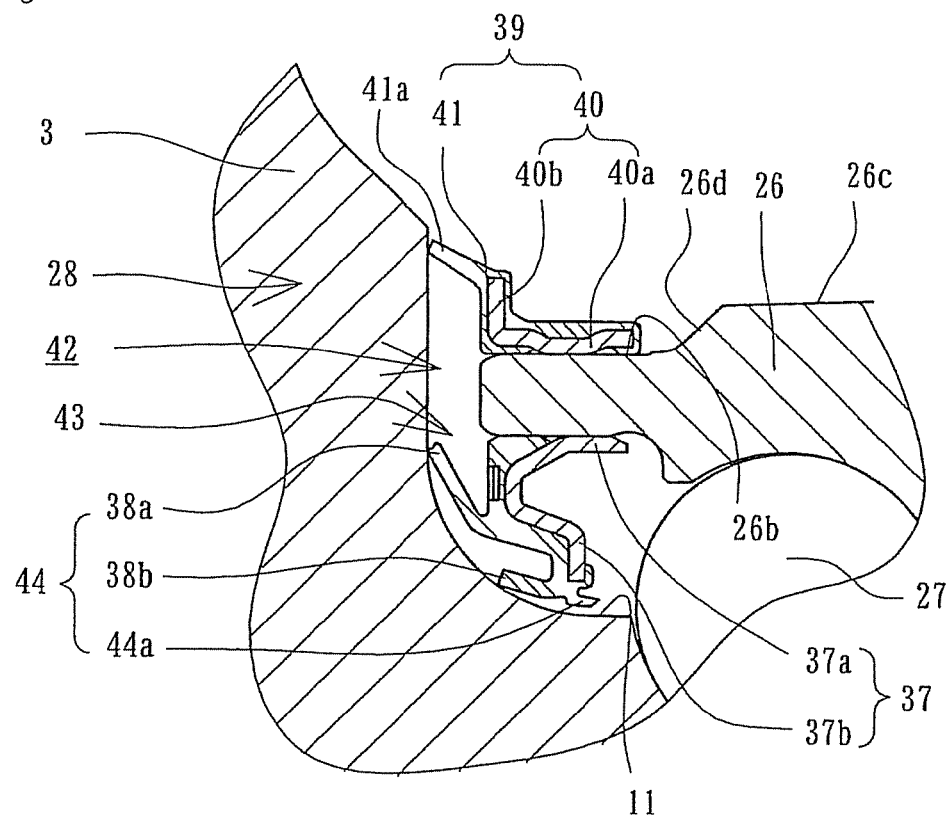
FIG. 6 is a partially enlarged sectional view of a modified embodiment of FIG. 5.

FIG. 4 is a longitudinal-section view of a second embodiment of a wheel bearing apparatus. FIG. 5 is a partially enlarged sectional view of FIG. 4, and FIG. 6 is a partially enlarged sectional view of a modified embodiment of FIG. 5. The same reference numerals are used as those used in the previous embodiment to designate the same structural elements in this embodiment.

This wheel bearing apparatus is that used for a driven wheel and has a structure of a so-called "third generation". The apparatus has an inner member 25, an outer member 26 and double row rolling elements (balls) 27, 27 rollably contained between the inner and outer members 25, 26. The inner member 25 includes a wheel hub 28 and an inner ring 29 press fit onto the wheel hub 28, via a predetermined interface.

The wheel hub 28 is integrally formed with a wheel mounting flange 3, one (outer-side one) 28a of the inner raceway surfaces 28a, 29a, and a cylindrical portion 28b which axially extends from the inner raceway surface 28a. The inner ring 29 is formed with the other (inner-side one) inner raceway surface 29a on its outer circumferential surface. The inner ring 29 is press fit onto the cylindrical portion 28b, via a predetermined interference. The inner ring 29 is secured in an axial direction relative to the wheel hub 28 by a caulked portion 4, formed by plastically deforming the end of the cylindrical portion 28b.

The wheel hub 28 is made of medium carbon steel such as S53C including carbon of 0.40~0.80% by weight. The wheel hub 28 is formed with a hardened layer having a surface hardness of 58~64 HRC by high frequency induction hardening. The hardening layer extends from the base 11 of the wheel mounting flange 3, forming a seal land portion for a first seal 36, to the cylindrical portion 28b. The inner ring and the rolling elements 27 are made of high carbon chrome bearing steel such as SUJ2 and are hardened to their core by dip hardening to have a hardness of 58~64 HRC.

The outer member 26 has an integrally formed body mounting flange 5b. Double row outer raceway surfaces 26a, 26a are formed on its inner circumferential surface and are arranged opposite to the inner raceway surfaces 28a, 29a of the inner member 25. Double row rolling elements 27, 27 are rollably contained, via cages 30, between the outer and inner raceway surfaces 26a, 28a and 26a, 29a. The outer member 26 is made of medium carbon steel such as S53C including carbon of 0.40~0.80% by weight. At least the double row outer raceway surfaces 26a, 26a are hardened to have surface hardness of 58~64 HRC by high frequency induction hardening.

Seals 31, 10 are arranged at both ends of the outer member 26 to seal an annular space formed between the outer member 26 and the inner member 25. These seals 31, 10 prevent leakage of lubricating grease contained within the bearing and ingress of rain water or dust into the bearing.

The inner-side seal 10 includes a slinger 32 and a sealing plate 33. The slinger 32 is made of austenitic-stainless steel sheet (JIS SUS 304 etc.) or preserved cold rolled steel sheet (JIS SPCC etc.). The steel is formed by press working to have a cross-section with a substantially "L" shaped configuration. The slinger 32 includes a cylindrical portion 32a press fit into the inner ring 29. A standing portion 32b extends radially outward from the cylindrical portion 32a. On the other hand the sealing plate 33 is also formed to have a cross-section of a substantially "L" shaped configuration fit onto the outer member 26 opposite to the slinger 32. The sealing plate 33 has a metal core 34 fitted into the end of the outer member 26 and a sealing member 35 adhered to the metal core 34 via vulcanized adhesion. The metal core 34 is made of austenitic-stainless steel sheet (JIS SUS 304 etc.) or preserved cold rolled steel sheet (JIS SPCC etc.) and is formed by press working.

The sealing member 35 is made of an elastic member such as rubber. The sealing member has a side lip and a radial lip in sliding contact with the slinger 32. The outer circumferential edge of the standing portion 32b of the slinger 32 opposes the metal core 34, via a slight radial distance, in order to form a labyrinth seal therebetween.

As shown in the enlarged view of FIG. 5, the outer-side seal 31 includes a first seal 36 and a second seal 39 arranged outside the bearing space of the first seal 36. The first seal 36 includes a metal core 37 and a sealing member 38 adhered to the metal core 37, via vulcanized adhesion. The metal core 37 is made by press working of austenitic-stainless steel sheet (JIS SUS 304 etc.) or preserved cold rolled steel sheet (JIS SPCC etc.). The metal core 37 has a cylindrical fitting portion 37a press fit into the inner circumferential surface of the outer member 26. An inner portion 37b is bent from the fitting portion 37a and extends radially inward.

The sealing member 38 is made of synthetic rubber such as nitrile rubber. The sealing member 38 is adhered to the metal core 37 in a region from a portion of the fitting portion 37a to the innermost end of the inner portion 37b. The sealing member 38 includes a pair of side lips 38a, 38b and a radial lip 38c. The radial lip 38c extends radially inward from the base of the radially innermost side lip 38b. The side lips 38a, 38b are inclined and have different length and extend radially outward to slidingly contact the base 11 of the wheel mounting flange 3, via a predetermined interference. The base 11 is formed to have a cross-section of a circular arc. The radial lip 38c is inclined radially inward toward the inner-side and slidingly contacts the outer circumferential surface of the base 11, via a predetermined interface, to prevent leakage of grease contained within the bearing.

The second seal 39 is adapted to be mounted on the outer circumferential surface of the end of the outer member 26. The second seal 39 includes a metal core 40 and a sealing member 41 integrally adhered to the metal core 40, via vulcanized adhesion. The metal core 40 is made by press working of austenitic-stainless steel sheet (JIS SUS 304 etc.) or preserved cold rolled steel sheet (JIS SPCC etc.). The metal core 40 includes a cylindrical circumferential portion 40a press fit onto the outer circumferential surface of the outer member 26. A standing portion 40b extends radially outward from the cylindrical portion 40a.

The sealing member 41 is made of synthetic rubber such as nitrile rubber. The sealing member 41 is adhered to the metal core 40 in a region from the circumferential portion 40a of the metal core 40 to the radially outermost end of the standing portion 40b. The sealing member 41 has an integrally formed inclined side lip 41a which extends radially outward. The side lip 41a slidingly contacts the base 11 of the wheel mounting flange 3, via a predetermined interference. According to this embodiment, the second seal 39, having the side lip 41a, is additionally arranged radially outside the first seal 36. Direct immigration of muddy water into the first seal 36 is prevented. Thus, the sealability can be improved. Accordingly, muddy water or dust does not reside or stay on the outer surface of the outer side lip. Thus, it is possible to prevent the generation of corrosion in the outer member 26 and the wheel hub 28 to extend the life of the bearing.

In the second seal 39, since the outer-side outer circumferential surface 26b of the outer member 26 is formed to have a smaller diameter than the outer circumferential surface 26c, via a tapered surface 26d, and the inclined side lip 41a is formed to extend radially outward from the outer circumference surface 26b, rain water or dust gathered on the side lip 41a can flow from its inclined surface toward the outer member 26. Further, it can flow downward along an annular recessed surface formed by the second seal 39, the outer circumferential surface 26b and the tapered surface 26d and finally drop off the seal. Accordingly, high sealability can be obtained. In addition since the sealing member 41 of the second seal 39 is secured on the surface of the cylindrical portion 40a of the metal core 40 so that the sealing member 41 surrounds the outer surface of the cylindrical portion 40a, the direct metal-to-metal contact between the metal core 40 and the outer member 26 is prevented. Thus, it is possible to prevent the generation of corrosion therebetween and to prevent ingress of muddy water through the cylindrical portion 40a.

Although a double row angular ball bearing is shown using balls as the rolling elements 27, the present invention is not limited to such an embodiment and thus a double row tapered roller bearing using tapered rollers as the rolling elements 27 may be also used. In addition, the wheel bearing apparatus of the present invention can be applied not only to the illustrated third generation type but to the first generation type, the second generation type and the fourth generation type of bearing structure if the bearing is an inner ring rotation type.

FIG. 6 is a partially enlarged sectional view showing a modification of FIG. 5. This embodiment is different from the embodiment of FIG. 5 only in the structure of the first seal. Thus, the same reference numerals are used as those used in the first embodiment to designate the same structural elements in this modified embodiment except for the first seal.

The outer-side seal 42 includes a first seal 43 and a second seal 39 arranged outside the bearing space of the first seal 43. The first seal 43 has a metal core 37 and a sealing member 44 adhered to the metal core 37, via vulcanized adhesion. The sealing member 44 is made of synthetic rubber, such as nitrile rubber. The sealing member 44 is adhered to the metal core 37 in a region from a portion of the fitting portion 37a of the metal core 37 to the radially innermost end of the inner portion 37b.

The sealing member 44 includes a pair of side lips 38a, 38b and a radial lip 44a. The radial lips 44a extends radially inward from the base of the radially innermost side lip 38b. The radial lip 44a is formed so that it extends toward the inner-side of the bearing and is arranged to oppose the outer circumferential surface of the base 11 of the wheel mounting flange 3, via a slight radial distance in order to form a labyrinth seal. This structure makes it possible to reduce the sealing torque and thus to improve fuel consumption as well as to improve the seal durability while suppressing an increase in temperature at the lip sliding contact portion.

Figure 7:
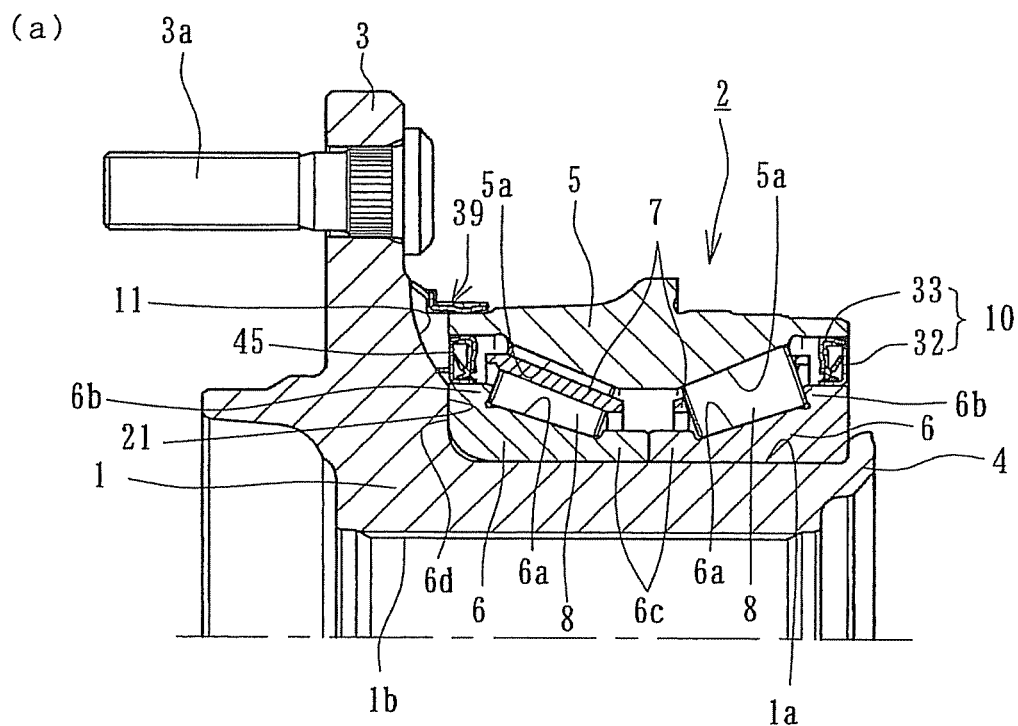
FIG. 7 (a) is a longitudinal-section view of a third embodiment of a wheel bearing apparatus.
Figure 7:
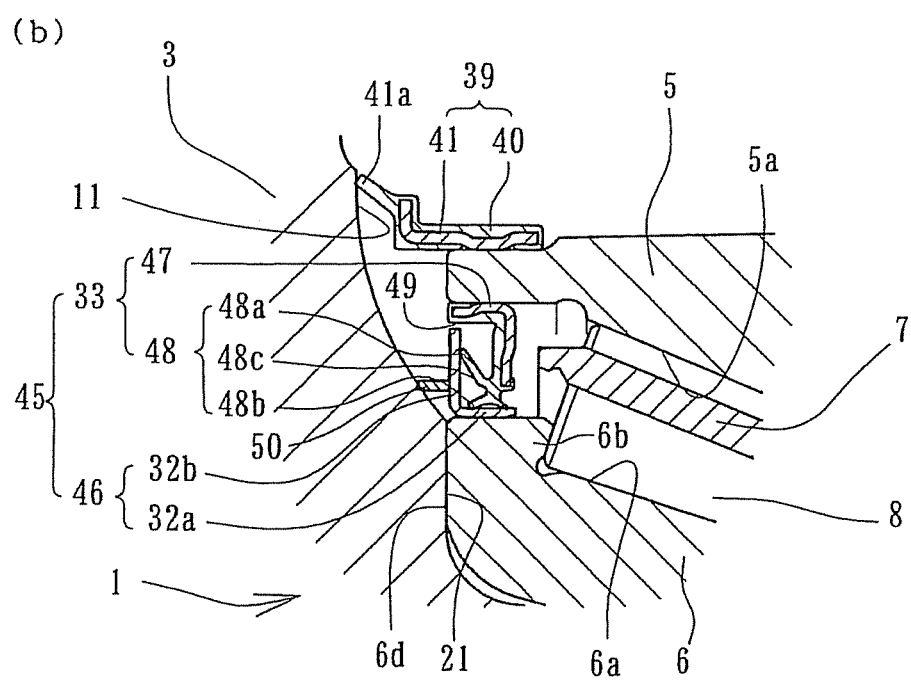

FIG. 7(a) is a longitudinal-section view of a third embodiment of a wheel bearing apparatus. FIG. 7(b) is a partially enlarged sectional view of FIG. 7 (a). This embodiment is different from first embodiment of FIG. 1 only in the structure of the outer-side seal. Thus, the same reference numerals are used as those used in the first embodiment to designate the same structural elements in this modified embodiment, except for the first seal.

The wheel bearing apparatus of this embodiment is that used for a driving wheel. The apparatus includes a wheel hub 1 and a wheel bearing 2 fit onto the wheel hub 1. The wheel bearing 2 includes an outer member 5, a pair of inner ring 6, 6, and double row rolling elements (tapered rollers) 8, 8 rollably contained, via cages 7, between the outer and inner raceway surfaces. A large flange 6b, to guide the rolling elements 8, is formed on a larger diameter end of each inner ring 6. A small flange 6c to prevent falling out of the rolling elements 8 is formed on its smaller end. The pair of the inner ring 6, 6 are arranged on the cylindrical portion 1a so that their smaller diameter ends abut each other to form a double row tapered roller bearing of a so-called back-to-back duplex bearing.

The inner ring 6 and the rolling elements 8 are made of high carbon chrome bearing steel such as SUJ2 and hardened to their core by dip hardening to have a hardness of 58~64 HRC. The inner ring 6 may be made of chrome bearing steel such as SCR435 and its surface may be hardened to a hardness of 58~64 HRC by carbonizing hardening.

Seals 45, 10 are mounted in annular spaces formed between the outer member 5 and the inner ring 6. The inner-side seal 10 of the seals 45, 10 forms a pack seal including an annular seal 33 and a slinger 32. Each has a substantially "L" shaped cross-section and are arranged opposite to each other. An outer-side seal 45 also fundamentally forms a pack seal. These seals 45, 10 prevent leakage of lubricating grease contained within the bearing and ingress of rain water and dust into the bearing.

As shown in FIG. 7(b), the outer-side seal 45 includes an annular sealing plate 33 and a slinger 46. The slinger 46 is made of ferritic stainless steel sheet (JIS SUS 430 etc.) or preserved cold rolled steel sheet (JIS SPCC etc.) and is formed by press working to have a cross-section with a substantially "L" shaped configuration. The core includes a cylindrical portion 32a press fit into the inner ring 6 and a standing portion 32b that extends radially outward from the cylindrical portion 32a.

The sealing plate 33 is mounted on the outer member 5 opposite to the slinger 46. The plate 33 includes a metal core 47 press fit into the inner circumferential surface at the end of the outer member 5. A sealing member 48 is integrally adhered to the metal core 47, via vulcanized adhesion. The metal core 47 is made of ferritic stainless steel sheet (JIS SUS 430 etc.) or preserved cold rolled steel sheet (JIS SPCC etc.) and formed by press working to have a cross-section with a substantially "L" shaped configuration. The sealing member 35 is made of synthetic rubber. The sealing member 48 includes a side lip 48a in sliding contact with the slinger 46 and a pair of radial lips 48b, 48c. The outer circumferential edge of the standing portion 32b of the slinger 46 opposes the sealing member 48, via a slight radial distance, in order to form a labyrinth seal 49.

In this embodiment a second seal 39 is mounted on the outer circumferential surface of the end of the outer member 5. Since this second seal 39 is same as that in the second embodiment (FIG. 5), the same reference numerals are used and duplicated description is omitted.

The second seal 39 prevents direct exposure of the seal 45 to the outside circumstances, direct immigration of rain water or dust into the seal 45, and stay or residence of the immigrated muddy water around the seal 45. In addition, since the base 11 of the wheel mounting flange 3 is formed to have a circular arc, it is possible to maintain a predetermined urging force on the side lip 41a although there would be variation in its interference.

In addition, according to this embodiment of the present invention, a lip member 50 formed of synthetic rubber such as nitrile rubber is integrally adhered to the side surface of the standing portion 32b of the slinger 46, via vulcanized adhesion. This lip member 50 is pressed against the base 11 of the wheel mounting flange 3 with a predetermined interference. The lip member 50 can seal abraded matter generated by fretting between the shoulder 21 and the larger end face 6d of the inner ring 6. Thus, lip member 50 can prevent immigration of the abraded matter into the seal 45 and the side lip 41a of the second seal 39. Accordingly, it is possible to provide a wheel bearing apparatus which can prevent wear of the side lips 48a, 41a caused by abraded matter immigrated between the sliding contact surfaces. Thus, it can improve the sealability and durability of seals 45, 39 to extend the life of the bearing.

Figure 8:
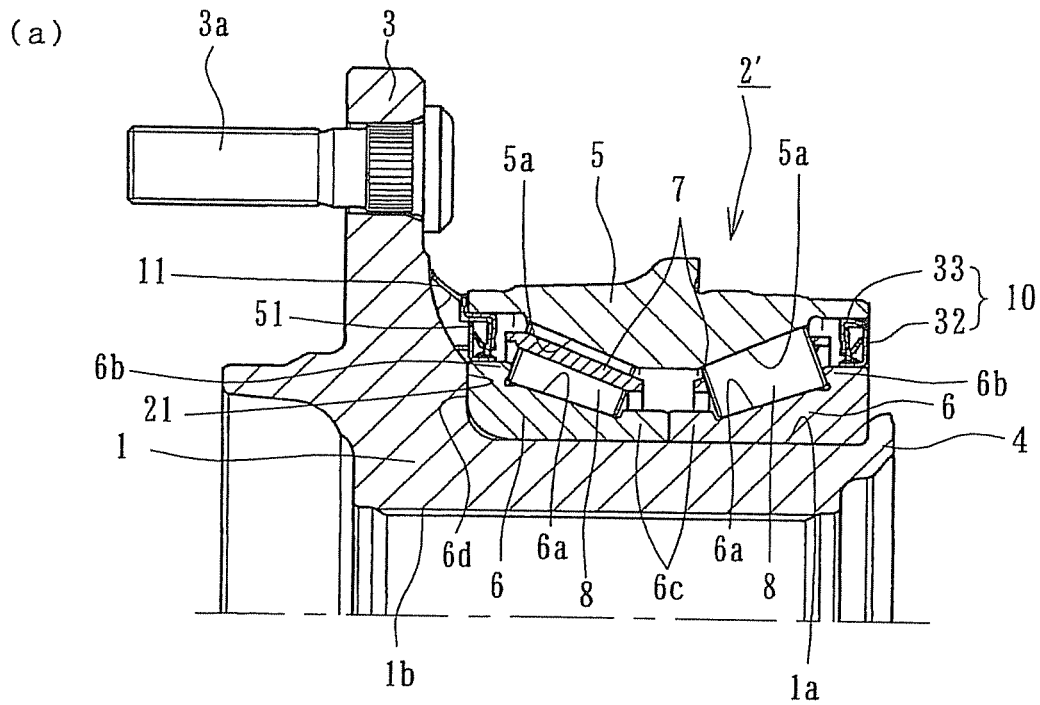
FIG. 8 (a) is a longitudinal-section view of a fourth embodiment of a wheel bearing apparatus.
Figure 8:
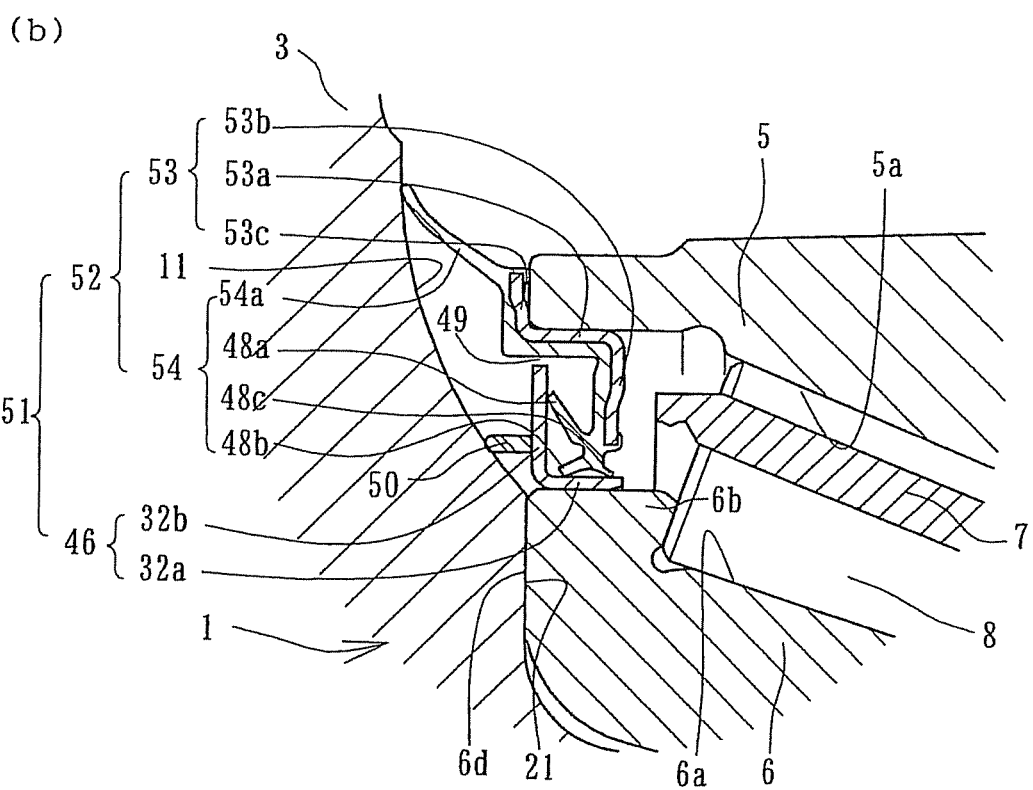
Figure 9:
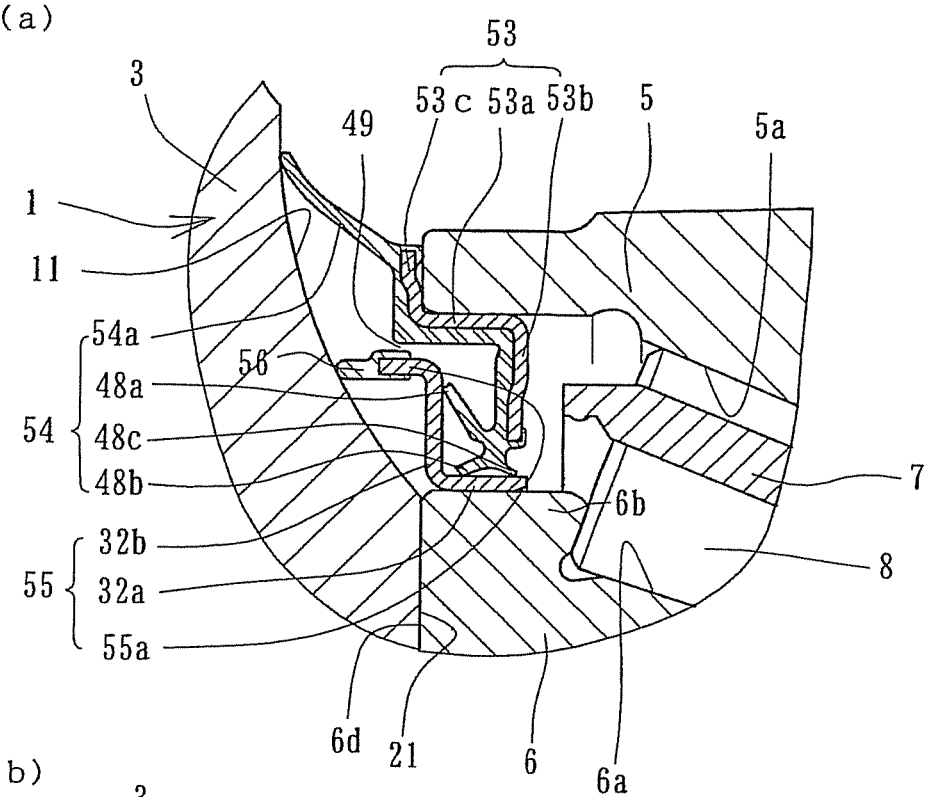
FIG. 9 (a) is a partially enlarged sectional view of a modified embodiment of an outer-side seal of FIG. 8 (b).
Figure 9:
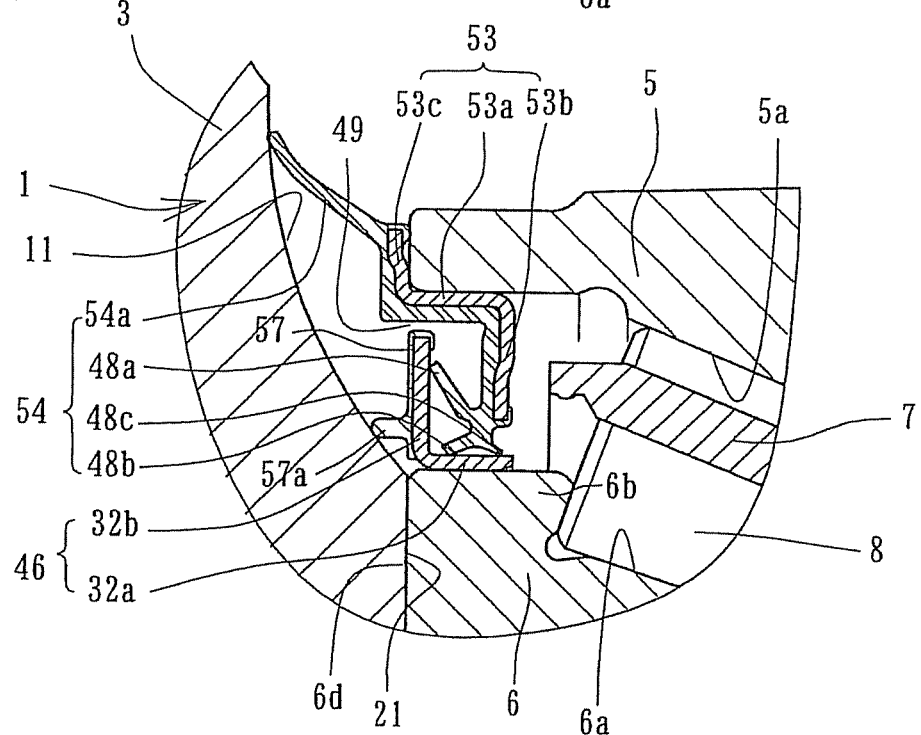

FIG. 8(a) is a longitudinal-section view of a fourth embodiment of a wheel bearing apparatus. FIG. 8(b) is a partially enlarged sectional view of FIG. 8(a). FIGS. 9(a) and 9(b) are partially enlarged sectional view showing a modification of FIG. 8(b). This embodiment is different from the previous embodiment of FIG. 7 only in the structure of the outer-side seal. Thus, the same reference numerals as those used in the previous embodiment are also used in this embodiment.

The wheel bearing apparatus of this embodiment includes a wheel hub 1 and a wheel bearing 2' press fit onto the wheel hub 1. The wheel bearing 2' includes an outer member 5, a pair of inner rings 6, 6, and double row rolling elements 8, 8 rollably contained, via cages 7, between the outer and inner raceway surfaces. The pair of the inner rings 6, 6 are arranged on the cylindrical portion 1a so that their smaller diameter ends abut each other to form a double row tapered roller bearing of a so-called back-to-back duplex bearing.

As shown in FIG. 8(b), an outer-side seal 51 includes an annular sealing plate 52 and a slinger 46. The sealing plate 52 has a metal core 53 mounted on the outer member 5 opposite to the slinger 46. A sealing member 54 is integrally adhered to the metal core 53, via vulcanized adhesion.

The metal core 53 is made of ferritic stainless steel sheet (JIS SUS 430 etc.) or preserved cold rolled steel sheet (JIS SPCC etc.) and formed by press working. The core 53 has a cylindrical portion 53a press fit into the inner circumferential surface of the end of the outer member 5. Inner and outer flange portions 53b, 53c radially extend from both ends of the cylindrical portion 53a.

The sealing member 54 is made of synthetic rubber such as nitrile rubber. The sealing member 54 includes a side lip 48a adhered to the inner flange portion 53b and in sliding contact with the slinger 46, a pair of radial lips 48b, 48c, and a side lip 54a adhere to the outer flange portion 53c of the metal core 53 and in sliding contact with the ground base 11 of the wheel mounting flange 3. All of the lips are integrally formed. This structure enables a reduction in the number of structural parts and thus reduces the size of the wheel bearing apparatus. In addition, similarly to the previously described embodiment, the lip member 50 can seal abraded matter generated by fretting between the shoulder 21 and the larger end face 6d of the inner ring 6. Thus, the lip member 50 can prevent immigration of the abraded matter into the sliding contact surfaces. Accordingly, it is possible to prevent wear of the side lips 54a, 48a and to improve the sealability and durability of the seal 51.

FIG. 9(a) shows a modification of FIG. 8(b) and its difference is only in the structure of the slinger. A slinger 55 is made of ferritic stainless steel sheet (JIS SUS 430 etc.) or preserved cold rolled steel sheet (JIS SPCC etc.) and is formed by press working. The slinger core includes a cylindrical portion 32a press fit into the inner ring 6, a standing portion 32b extending radially outward from the cylindrical portion 32a, and a flange portion 55a axially extending from the standing portion 32b. A lip member 56 is formed of synthetic rubber such as nitrile rubber. The lip member 56 is integrally adhered to the flange portion 55a via vulcanized adhesion. The lip member 56 is pressed against the base 11 of the wheel mounting flange 3 with a predetermined interference. Such a structure makes it possible to easily press the standing portion 32b with a press fit jig during press fitting of slinger 55 into the inner ring 6 and thus improves the efficiency of assembly.

FIG. 9(b) shows a modified embodiment of FIG. 8(b) where the sealing member 57 is integrally adhered to the standing portion 32b of the slinger 46 and extends to the inner surface of the standing portion 32b. A lip member 57a projects from the sealing member 57. The lip member 57a is rigidly secured on the slinger 46. Similarly to the previously described embodiment, the lip member 57a can seal abraded matter generated by fretting between the shoulder 21 and the larger end face 6d of the inner ring 6. Thus, the lip member 57a can prevent immigration of the abraded matter into the sliding contact surfaces. Accordingly, it is possible to prevent wear of the side lips 54a, 48a and to improve the sealability and durability of the seal.

Figure 10:
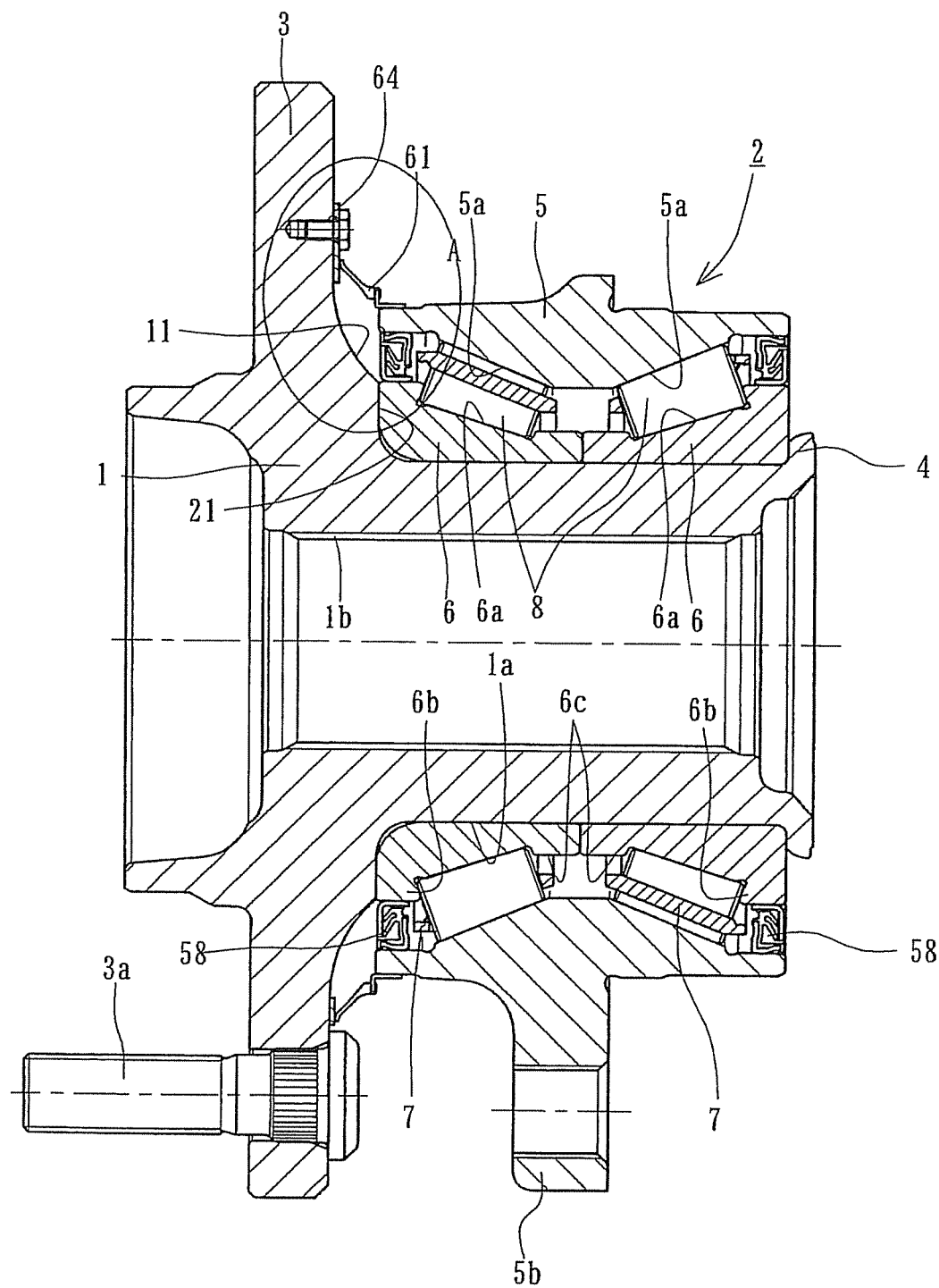
FIG. 10 is a longitudinal-section view of a fifth embodiment of a wheel bearing apparatus.
Figure 11:
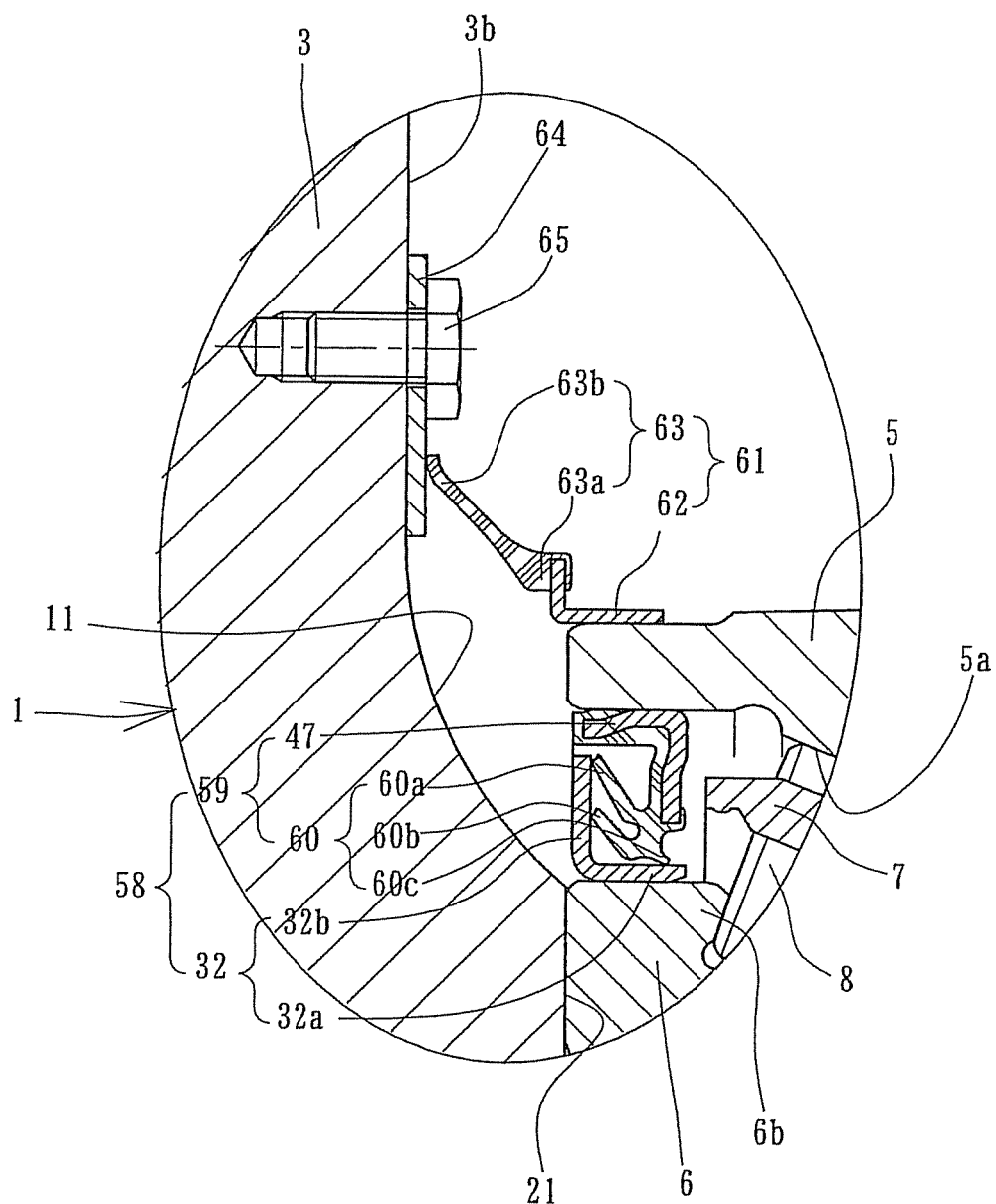
FIG. 11 is a partially enlarged sectional view of a region encircled by "A" in FIG. 10.
Figure 12:
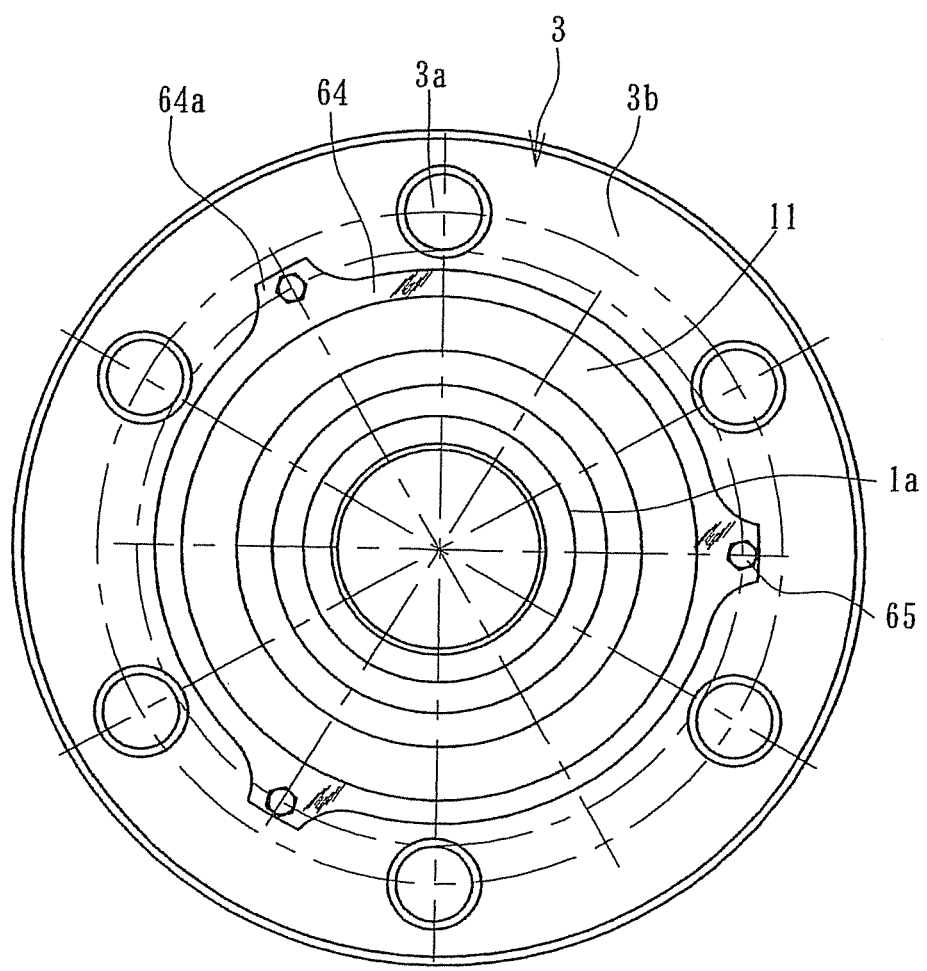
FIG. 12 is a side elevation view of a wheel hub shown in FIG. 10.

FIG. 10 is a longitudinal-section view of a fifth embodiment of a wheel bearing apparatus. FIG. 11 is a partially enlarged sectional view of a region encircled by "A" in FIG. 10, and FIG. 12 is a side elevation view of a wheel hub shown in FIG. 10. This embodiment is different from the fourth embodiment of FIG. 7 only in the structure of the outer-side seal. Thus, the same reference numerals as those used in the fourth embodiment are also used in this embodiment.

The wheel bearing apparatus is that used for a driving wheel and has a so-called "second generation" structure. The apparatus includes a wheel hub 1 and a wheel bearing 2. The wheel bearing 2 includes the outer member 5 and the pair of inner rings 6, 6 on which double row rolling elements (tapered rollers) 8, 8 are arranged.

Seals 58, 58 are mounted in annular spaces formed between the outer member 5 and inner rings 6, 6. The seals prevent leakage of grease contained within the bearing and ingress of rain water or dust into the bearing. As shown in FIG. 11, the seal 58 comprises a sealing plate 59 and a slinger 32 each having a substantially "L" shaped cross-section and arranged opposite to each other to form a so-called seal pack. The sealing plate 59 has a metal core 47 press fit into the inner circumferential surface at the end of the outer member 5. A sealing member 60 is integrally adhered to the metal core 47, via vulcanized adhesion. A pair of side lips 60a, 60b slidingly contact a standing portion 32b of the slinger 32. A radial lip 60c slidingly contacts a cylindrical portion 32a of the slinger 32.

In this embodiment a backup seal (second seal) 61 is press fit onto the outer circumferential surface at the end of the outer member 5. The backup seal 61 has a metal core 62 and a sealing member 63 integrally adhered to the metal core 62, via vulcanized adhesion. The metal core 62 is made by press forming of austenitic stainless steel sheet (JIS SUS 304 etc.) or preserved cold rolled sheet (JIS SPCC etc.) to have a substantially "L" shaped cross-section. The sealing member 63 includes a base portion 63a secured on the outer circumferential edge of the metal core 62 and an inclined side lip 63b extending outward like a horn configuration. This side lip 63b slidingly contacts an annular metal plate ring 64 mounted on the inner-side side face 3b of the wheel mounting flange 3 and prevents direct ingress of rain water or dust into the seal 58. Accordingly, it is possible to prevent muddy water or dust from being stayed in a narrow annular space between the wheel hub 1 and the wheel bearing 2 to prevent the generation of corrosion on the base 11 of the wheel mounting flange 3. Thus, the durability of the bearing can be improved.

The annular metal plate ring 64 is made by press forming of austenitic stainless steel sheet (JIS SUS 304 etc.) or preserved cold rolled sheet (JIS SPCC etc.). The plate ring 64 is fastened on the wheel mounting flange 3 by securing bolts 65. It is preferable to secure the ring 64 via a packing (not shown) in order to improve adhesion to the side face 3b of the wheel mounting flange 3.

As shown in FIG. 12, the annular metal plate ring 64 has a disc configuration and several (three in this embodiment) securing portions 64a spaced apart along its periphery. The annular metal plate ring 64 is finished so that it has a predetermined surface hardness and surface roughness. Thus, it is possible to have an excellent sliding contact sealing surface only by mounting the ring 64 on the wheel mounting flange 3. Accordingly, it is unnecessary to grind the side face of the wheel mounting flange where the side lip slidingly contacts to finish the side face to have a predetermined surface roughness. Thus, it is possible to provide a wheel bearing apparatus which can improve the sealability of the seal 58 and maintain high bearing performance for a long term even though it is used under severe conditions.

Although it is shown as a second generation structure used for a driving wheel, the wheel bearing apparatus is not limited to such a structure and can be applied to those having a body mounting flange 5b on the periphery of the outer member 5 irrespective of the third or fourth generation structure. This embodiment can be applied to a driven wheel.

In addition, although a double row tapered roller bearing using tapered rollers as rolling elements 8 of the wheel bearing 2 is shown, the present disclosure is not limited to such an embodiment. Thus, a double row angular ball bearing using balls as the rolling elements 8 may also be used. In addition, although it is shown as a double row tapered roller bearing using tapered rollers as the rolling elements 8 of the wheel bearing 2, the present disclosure is not limited to such an embodiment and thus a double row angular ball bearing using balls and tapered rollers as the rolling elements 8 may also be used.

Figure 13:
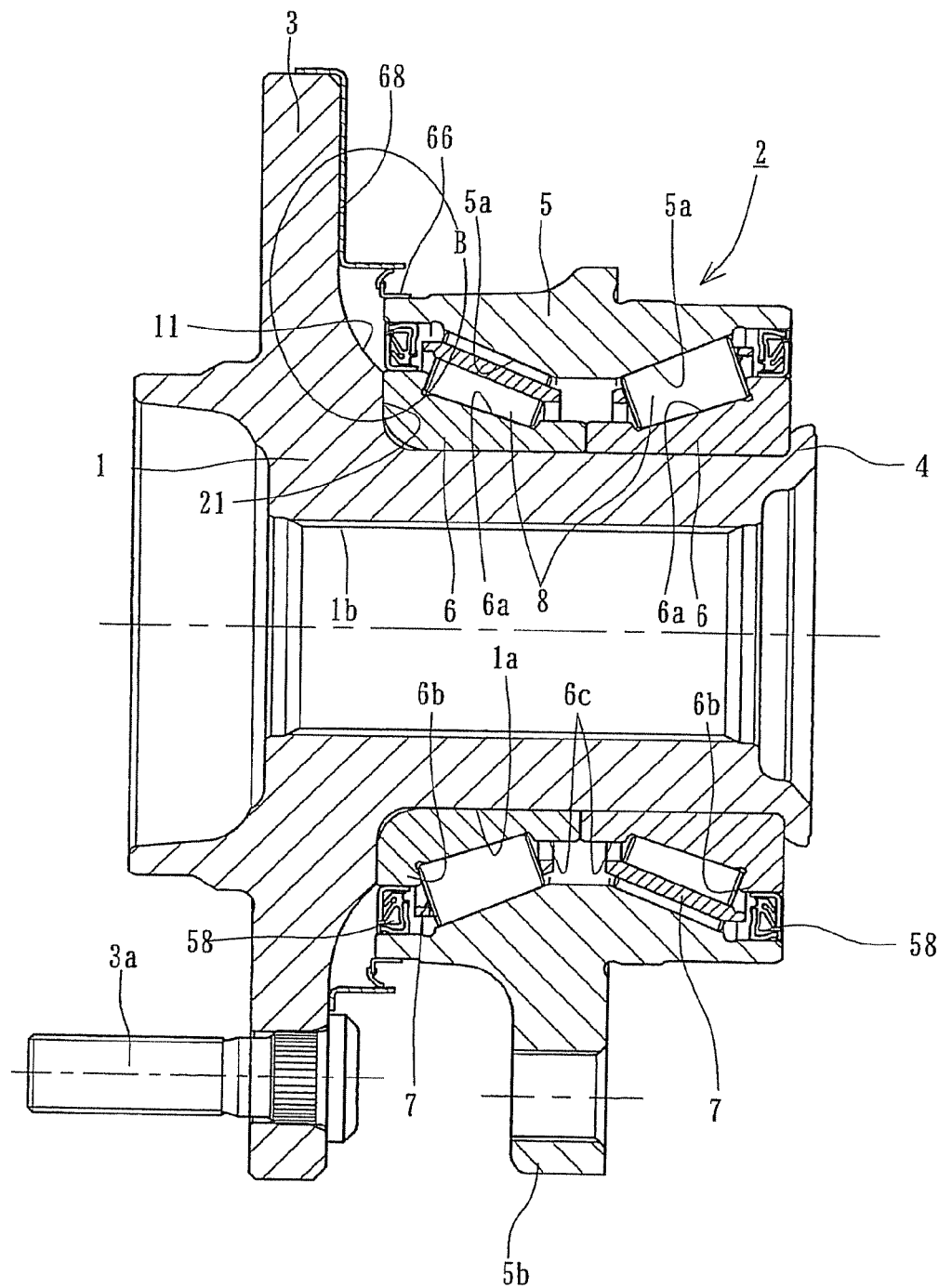
FIG. 13 is a longitudinal-section view of a sixth embodiment of a wheel bearing apparatus.
Figure 14:
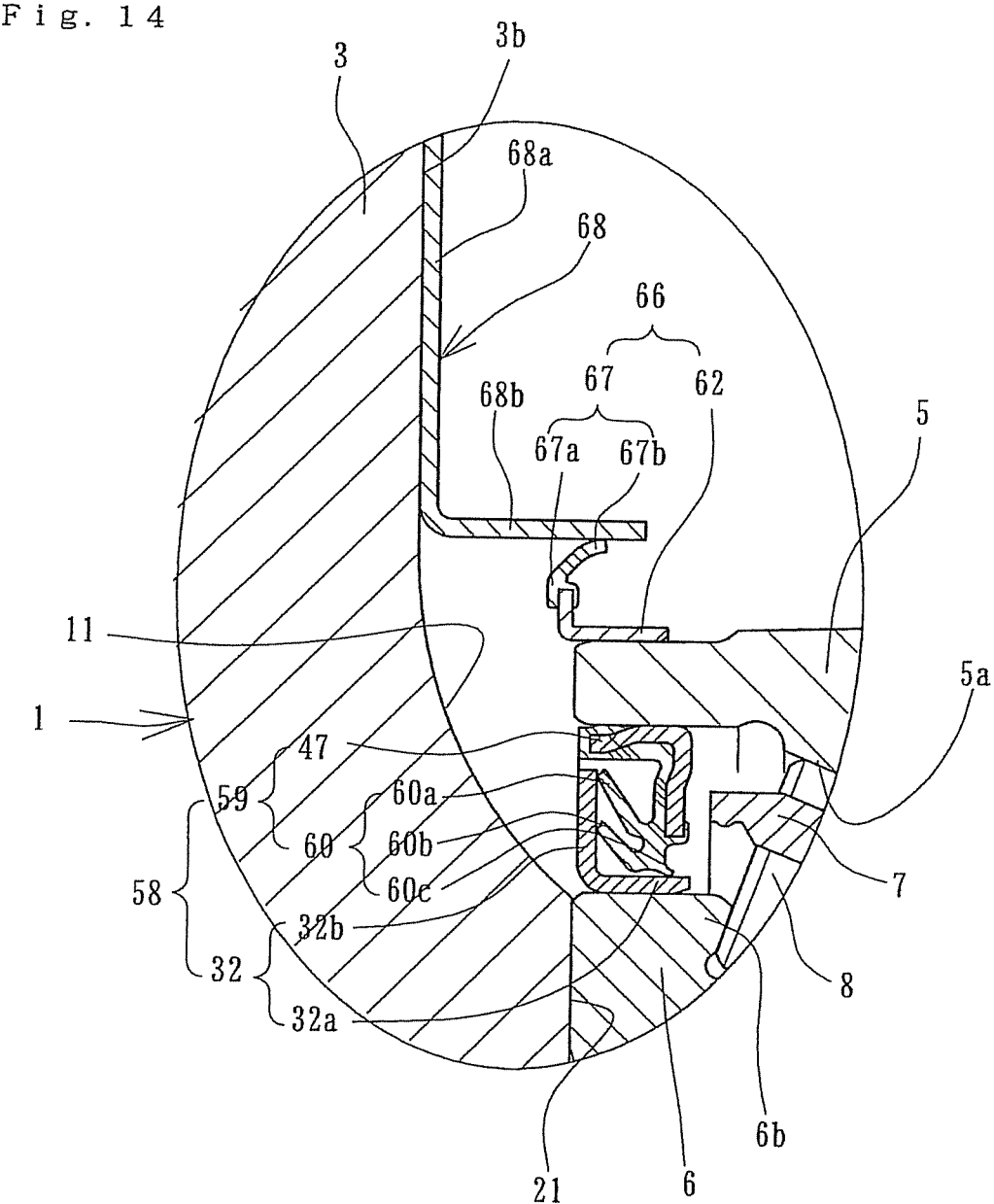
FIG. 14 is a partially enlarged sectional view of a region encircled by "B" in FIG. 13.
Figure 15:
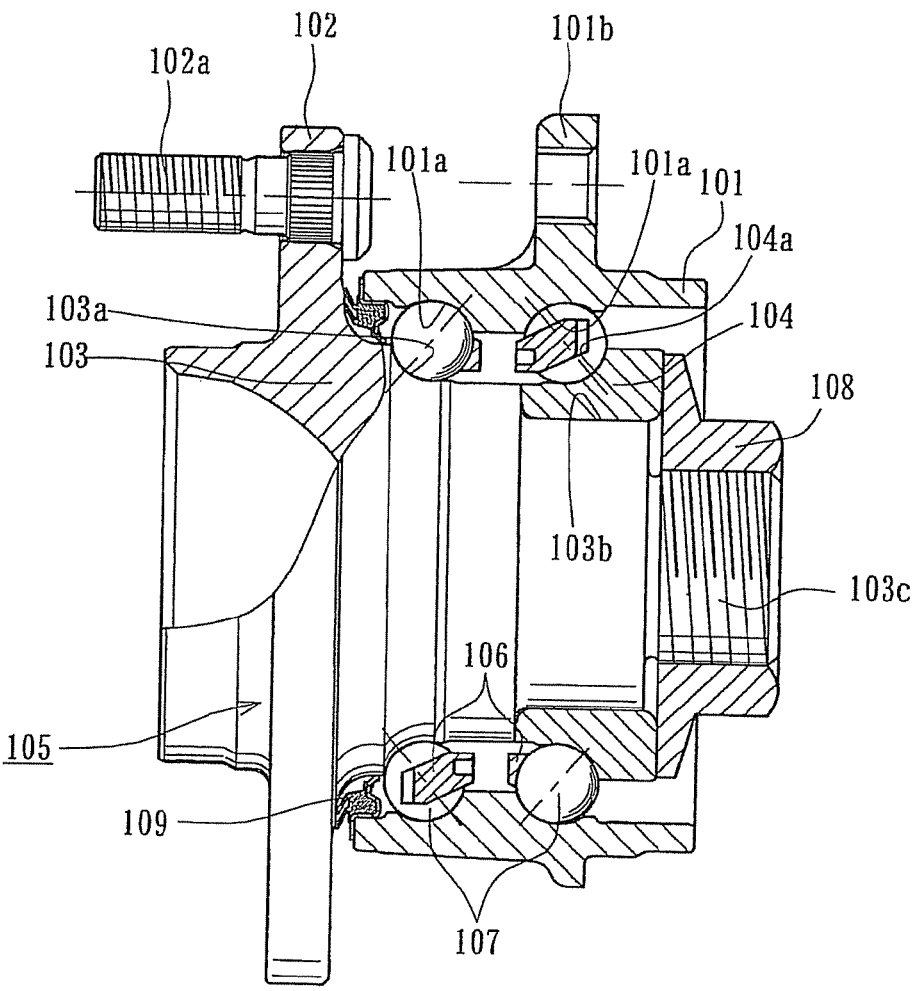
FIG. 15 is a longitudinal-section view of a wheel bearing apparatus of the prior art.
Figure 16:
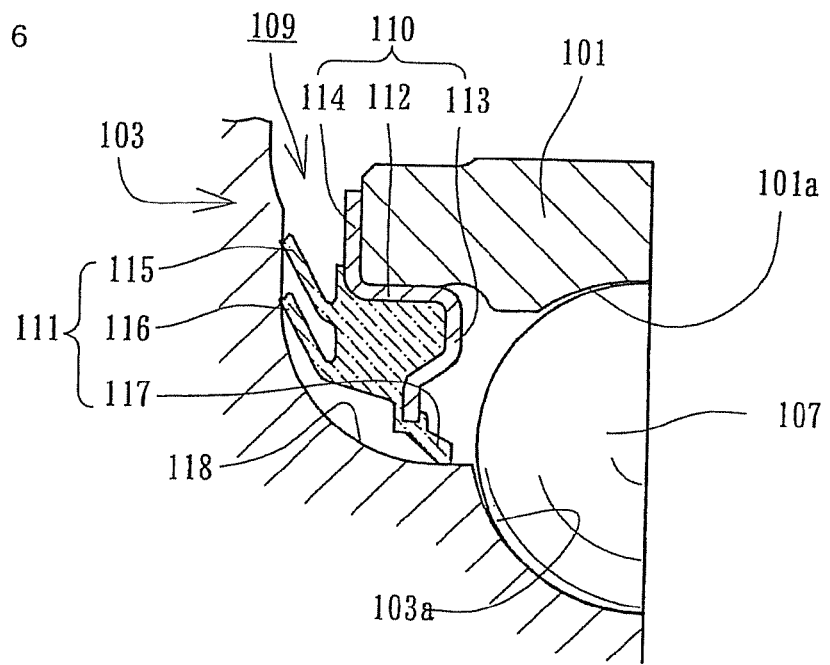
FIG. 16 is a partially enlarged sectional view of FIG. 15.

FIG. 13 is a longitudinal-section view of a sixth embodiment of a wheel bearing apparatus. FIG. 14 is a partially enlarged sectional view of a region encircled by "B" in FIG. 13. This embodiment is different from the fifth embodiment of FIG. 11 only in the structure of the backup seal and the annular metal plate ring. Thus, the same reference numerals as those used in the fifth embodiment are also used in this embodiment.

In this embodiment, a backup seal 66 is press fit onto the circumferential surface at the end of the outer member 5. As shown in an enlarged view of FIG. 14, this backup seal 66 includes a metal core 62 and a sealing member 67 integrally adhered to the metal core 62, via vulcanized adhesion. This sealing member 67 has a base portion 67a secured onto the metal core 62. An inclined radial lip 67b extends radially outward from the base portion 67a toward the inner-side. This radial lip 67b slidingly contacts an annular metal plate ring 68 mounted on an inner-side side face 3b of the wheel mounting flange 3 and prevents ingress of rain water or dust into the seal 58.

The annular metal plate ring 68 is made by press working of austenitic-stainless steel sheet (JIS SUS 304 etc.) or preserved cold rolled steel sheet (JIS SPCC etc.). The ring 68 is fitted onto the outer circumferential surface of the wheel mounting flange 3. The annular metal plate ring 68 has a disc portion 68a closely contacted on the side face 3b, except for portions of the hub bolts 3a, and a cylindrical projected portion 68b on which the radial lip 67b of the backup seal 66 slidingly contacts. It is preferable to mount the metal plate ring 68 to the wheel mounting flange 3 via a packing (not shown) in order to improve adhesion to the wheel mounting flange 3. The annular metal plate ring 68 is finished so that it has predetermined surface hardness and surface roughness. Thus, it is possible to have an excellent sliding contact sealing surface only by mounting the ring 68 on the wheel mounting flange 3. Thus, it is possible to provide a wheel bearing apparatus which can improve the sealability of the seal 58 and maintain high bearing performance for a long term even though it is used under severe conditions.

The wheel bearing apparatus can be applied to wheel bearing apparatus of first, second. third and fourth generations of inner ring rotation type.

The present disclosure has been described with reference to the preferred embodiment. Obviously, modifications and alternations will occur to those of ordinary skill in the art upon reading and understanding the preceding detailed description. It is intended that the present invention be construed to include all such alternations and modifications insofar as they come within the scope of the appended claims or their equivalents.

What is claimed is:

1. A vehicle wheel bearing apparatus comprising:
an outer member formed, on an outer circumference of the outer member, with a body mounting flange to be mounted on a suspension of a vehicle and on an inner circumference with double row outer raceway surfaces;
an inner member including a wheel hub formed, on one end, with a wheel mounting flange and on an outer circumference of the inner member with a cylindrical portion, an inner ring or an outer joint member of a constant velocity universal joint press-fit onto the wheel hub and formed, on an outer circumference of the inner member, with inner raceway surfaces arranged opposite to the double row outer raceway surfaces;
double row rolling elements freely rollably held by cages between the outer and inner raceway surfaces of the outer and inner members;
seals mounted radially inward of the outer member within annular openings formed between the outer and the inner members;
a backup seal arranged radially outward of an outer side primary seal of said seals, the backup seal being separate and discrete from the primary seal, the backup seal prevents ingress of debris into the outer side primary seal;
the backup seal comprises a metal core and a sealing lip inclined radially outward from the metal core toward the outer side, the metal core secures the backup seal with the outer member, the metal core has an L shape with a radial leg and an axial leg, a portion of the axial leg extending axially outward beyond an end of the outer member toward the wheel mounting flange and the radial leg portion extends radial outward from the axial leg portion that extends beyond the end of the outer member toward the wheel mounting flange; and
the sealing lip extends away from the wheel mounting flange from the radial leg of the metal core in order to prevent direct ingress of muddy water or dust into the primary seal, a gap is formed between the sealing lip and axial leg of the metal core, the sealing lip slidingly contacts an annular metal member to define a collection area between the annular member, the sealing lip, radial leg portion and axial leg portion such that the collection area is exposed to the outer circumference of the outer member toward an inner side direction of the vehicle wheel bearing apparatus to prevent the ingress of the debris into the outer side primary seal, said annular metal member is pressed from a steel sheet having preservation properties and is bolted on a side face of the wheel mounting flange of the inner side.

2. The vehicle wheel bearing apparatus of claim 1, wherein the annular metal member is formed, on an outer circumference of the annular metal member, with an axially extending cylindrical portion to be fit onto the outer circumference of the wheel mounting flange.

3. The vehicle wheel bearing apparatus of claim 2, wherein a clearance is provided between the end of the cylindrical portion of the annular metal member and a side face of the outer side of the wheel mounting flange.

4. The vehicle wheel bearing apparatus of claim 2, wherein the cylindrical portion of the annular metal member is mounted on the outer circumference of the wheel mounting flange via an interference fit.

* * * * *